(12) United States Patent
Borrmann et al.

(10) Patent No.: US 10,873,550 B2
(45) Date of Patent: Dec. 22, 2020

(54) METHODS FOR COMMUNICATION IN A COMMUNICATION NETWORK FOR REDUCED DATA TRAFFIC

(71) Applicant: ARTEGIC AG, Bonn (DE)

(72) Inventors: Eric Borrmann, Cologne (DE); Jörg Sayn, Bonn (DE)

(*) Notice: Subject to any disclaimer, the term of this patent is extended or adjusted under 35 U.S.C. 154(b) by 0 days.

(21) Appl. No.: 16/328,801

(22) PCT Filed: Aug. 31, 2017

(86) PCT No.: PCT/DE2017/100735
§ 371 (c)(1),
(2) Date: Jun. 3, 2019

(87) PCT Pub. No.: WO2018/041305
PCT Pub. Date: Mar. 8, 2018

(65) Prior Publication Data
US 2019/0288971 A1 Sep. 19, 2019

(30) Foreign Application Priority Data
Sep. 1, 2016 (DE) .................. 10 2016 010 520

(51) Int. Cl.
*H04L 12/58* (2006.01)
*G06F 16/27* (2019.01)
(Continued)

(52) U.S. Cl.
CPC ............. *H04L 51/12* (2013.01); *G06F 16/27* (2019.01); *G06Q 10/10* (2013.01);
(Continued)

(58) Field of Classification Search
CPC ..... H04L 51/12; H04L 41/5061; H04L 51/26; G06F 16/27; G06F 16/951; G06Q 10/10; G06Q 30/0201
See application file for complete search history.

(56) References Cited

U.S. PATENT DOCUMENTS 6,779,022 B1   8/2004 Horstmann
2004/0153360 A1* 8/2004 Schumann ............. G06Q 30/02
                                                    725/90
(Continued)

FOREIGN PATENT DOCUMENTS

DE     102010012847     4/2015

OTHER PUBLICATIONS

The International Search Report (ISR) for PCT/DE2017/100735, dated Nov. 27, 2017, pp. 1-3.
(Continued)

*Primary Examiner* — Viet D Vu
(74) *Attorney, Agent, or Firm* — McDonnell Boehnen Hulbert & Berghoff LLP

(57) ABSTRACT

The invention relates to a method for communication in a communication network 1 having at least one transmitter 2 and at least one receiver, wherein at least one message is sent from the transmitter 1 to the receiver, and a relevance of the message for the receiver is determined, wherein the communication network 1 comprises at least one test receiver 11*a*, a first survey receiver 22*a*, a second survey receiver 22*b*, the final receiver 3*a*, a tracking server 5, a receiver database 6, a survey database 7, an evaluation module 121, a selection module 122, and a central server 8, and a relevance of a final message 30*a* for the final receiver 3*a* is determined before the final message 30*a* is sent.

20 Claims, 3 Drawing Sheets

(51) Int. Cl.
*G06Q 10/10* (2012.01)
*G06Q 30/02* (2012.01)
*H04L 12/24* (2006.01)
*G06F 16/951* (2019.01)

(52) U.S. Cl.
CPC ..... *G06Q 30/0201* (2013.01); *H04L 41/5061* (2013.01); *H04L 51/26* (2013.01); *G06F 16/951* (2019.01)

(56) References Cited

U.S. PATENT DOCUMENTS

| | | | |
|---|---|---|---|
| 2006/0075037 A1 | 4/2006 | Rothschild | |
| 2007/0179945 A1* | 8/2007 | Marston | G06Q 10/107 |
| 2008/0300986 A1* | 12/2008 | Lee | G06Q 30/02 |
| | | | 705/14.41 |
| 2009/0150215 A1* | 6/2009 | Kalb | G06Q 30/02 |
| | | | 705/7.29 |
| 2016/0140650 A1 | 5/2016 | Gong | |

OTHER PUBLICATIONS

Written Opinion of the International Searching Authority for PCT/DE2017/100735, dated Nov. 27, 2017, pp. 1-20.
International Preliminary Report on Patentability for PCT/DE2017/100735, dated Aug. 24, 2018, pp. 1-5.

* cited by examiner

METHODS FOR COMMUNICATION IN A COMMUNICATION NETWORK FOR REDUCED DATA TRAFFIC

CROSS REFERENCE TO RELATED APPLICATION

This application is a U.S. national phase of International Application No. PCT/DE2017/100735, filed Aug. 31, 2017, which claims priority to German Patent Application No. 102016010520.8, filed Sep. 1, 2016, both of which are incorporated by reference herein in their entirety.

FIELD

The disclosure relates to a method for communication in a communication network for reduced data traffic and/or relevance of messages to a receiver is determined.

The invention relates to a method for communication in a communication network with at least one transmitter and at least one receiver, wherein at least one message is sent from the transmitter to the receiver, and a relevance of the message for the receiver is determined.

BACKGROUND

Such a method is known from the DE 10 2010 012 847 B4. The method described in the DE 10 2010 012 847 B4 provides that a relevance of messages for the receiver is determined in the form of an urgency after the receiving of the messages of one or several information sources by means of a filter module that cooperates with an urgency analysis module and optionally with an artificial intelligence module. Furthermore, the method described in the DE 10 2010 012 847 B4 provides that a big set of messages reach the receiver and are scanned at the receiver by means a content aggregator. Is the method described in the DE 10 2010 012 847 B4 applied to a huge amount of receivers in the communication network, thus a very high data traffic is resulting in the communication network between the transmitter and the receivers. Such a high data traffic may result in a failure of the communication network.

SUMMARY

The present invention's purpose is to provide a method for communication in a communication network that reduces a data traffic between the transmitter and several receivers.

DETAILED DESCRIPTION

Figure 1:
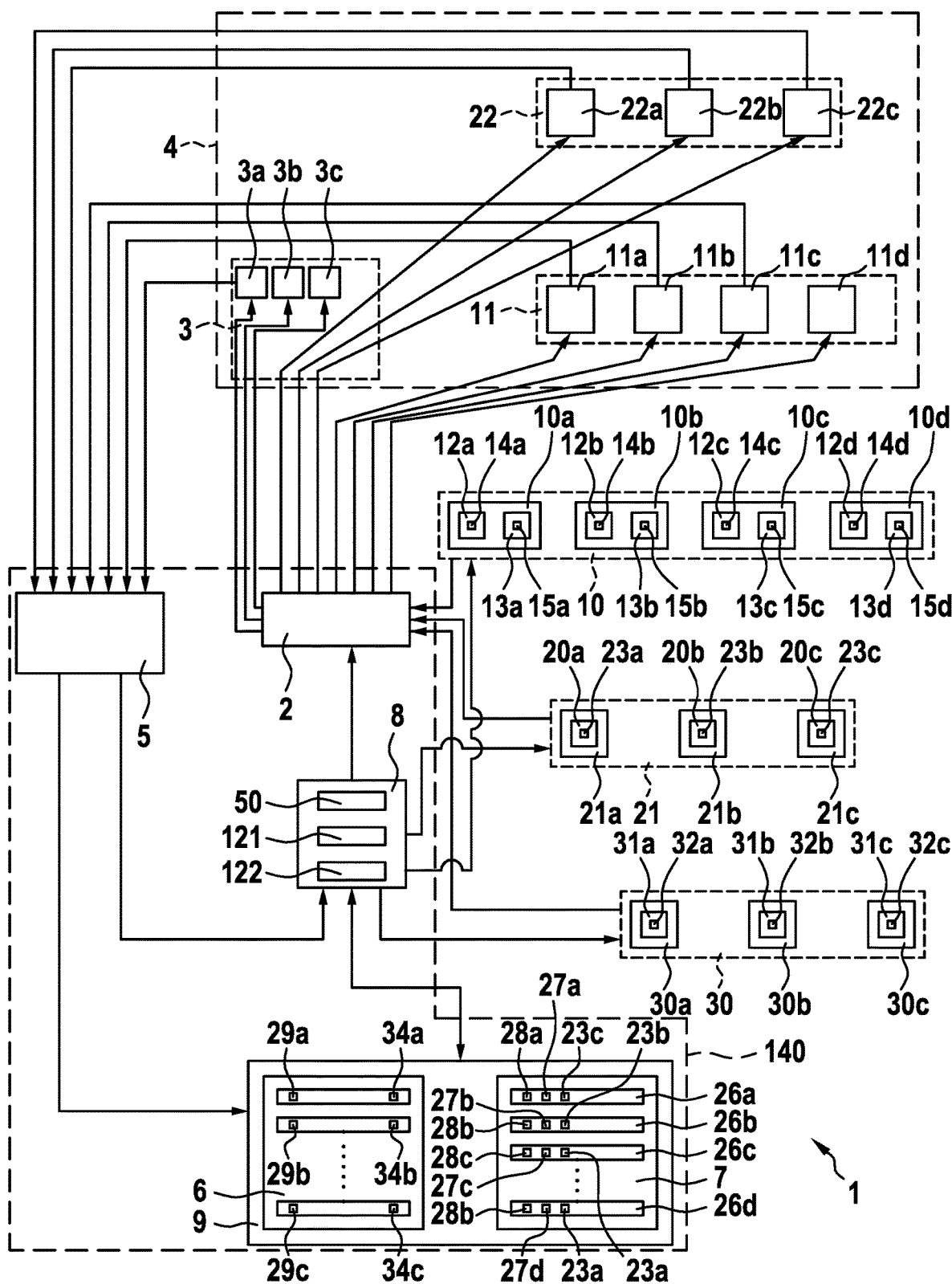
FIG. 1 a communication network with at least one transmitter, several receivers, a tracking server, a receiver database, a survey database, a central server and a database server.

This purpose is accomplished according to the present invention by a method with the features of claim 1, a nonvolatile computer readable information storage medium according to claim 14, a communication network according to claim 15 and a transmitter infrastructure according to claim 16. Advantageous embodiments with advantageous configurations of the invention result from the remaining claims, the description and the figures.

In order to provide a method for communication in a communication network that reduces a data traffic between the transmitter and several receivers, a method for communication in a communication network with at least one transmitter and at least one receiver is provided, wherein at least one message is sent from the transmitter to the receiver, a relevance of the message for the receiver is determined, and that the communication network comprises at least one first test receiver, a first survey receiver, a second survey receiver, a final receiver, a tracking server, a receiver database, a survey database, an evaluation module, a selection module and a central server and a relevance of a final message for the final receiver is determined before sending the final message, using the following steps. In a first step a first test message 10a, a second test message, a third test message, and a fourth test message is generated by means of the central server.

The test messages are generated in such a manner that each test message comprises at least one first message feature, and the first message feature of the first test message and the first message feature of the second test message are changeable by means of a change in a respective corresponding value of a first parameter, and the first message feature of the third test message and the first message feature of the fourth test message are changeable by means of a change in a respective corresponding value of a second parameter.

Furthermore the respective corresponding values of the first parameter are different and the respective corresponding values of the second parameter are different, i.e. the value of the first parameter of the first message feature of the first test message is different from the value of the first parameter of the first message feature of the second test message and the value of the second parameter of the first message feature of the third test message is different from the value of the second parameter of the first message feature of the fourth test message.

In a second step the first test message, the second test message, the third test message, and the fourth test message to the first test receiver, the second test receiver, the third test receiver, and/or the fourth test receiver by means of the transmitter. In doing so, all test messages may be sent to an individual test receiver, to only two, to three or to all test receivers. As well, it is possible to send a proportion of the test messages, for example the first, the second and/or the third test message to one, the first, test receiver and to send the remaining proportion of the test messages to the remaining test receivers, i.e. to the second, third and/or fourth test receiver. In a further embodiment of the method, the first, the second, the third and/or the fourth test message may be sent twice or several times to one, to two or to several of the test receivers.

In a third step of the provided method a first reaction behavior with respect to the test messages is detected by means of the tracking server. In a fourth step the first reaction behavior is evaluated by means of the evaluation module. In a fifth step an influence value of the first parameter, which detects an influence of the first parameter on the first reaction behavior with respect to the test messages and an influence value of the second parameter, which detects an influence of the second parameter on the first reaction behavior with respect to the test messages are determined, preferably by means of the evaluation module.

In a sixth step the influence value of the first parameter is compared to the influence value of the second parameter, preferably by means of the selection module, and a selection parameter is determined by means of the selection module, wherein the particular one of the two parameters, the first parameter and the second parameter that has the greater influence value is determined as the selection parameter.

In a seventh step at least one first survey message, a second survey message, and preferably a third survey message is generated by means of the central server, wherein the survey messages each comprise at least one first selection message feature, wherein the respective first selection message feature is changeable by means of a change in a respective corresponding value of the selection parameter, and the respective corresponding values of the selection parameter are different.

In an eighth step the first survey message, the second survey message, and preferably the third survey message are sent to at least the first survey receiver, the second survey receiver, and/or the third survey receiver by means of the transmitter, wherein the survey receivers are distinguishable by at least one first receiver feature.

In a ninth step a second reaction behavior with respect to the survey messages is detected by means of the tracking server. In a tenth step the second reaction behavior is evaluated by means of the evaluation module.

In an eleventh step a respective survey data set for at least two survey receivers is created, preferably by means of the central server, wherein the respective survey data set comprises a value of the first receiver feature of the respective survey receiver, an evaluation of a corresponding individual second reaction behavior of the respective survey receiver and a corresponding value of the selection parameter of the survey message received by the respective survey receiver.

In a twelfth step at least two of the survey data sets are stored in the survey database on the database server, wherein an association of the values of the first receiver feature with the values of the selection parameter and with the evaluations of the individual second reaction behavior is provided by means of the survey data sets stored in the survey database.

In a thirteenth step a final message is sent to the final receiver by means of the transmitter, wherein a value of the first receiver feature of the final receiver is read out from the receiver database, the final message comprises at least one first final message feature, the first final message feature is changeable by means of a change in a corresponding value of the selection parameter, the value of the selection parameter is adapted to the read-out value of the first receiver feature of the final receiver by means of the association provided by the survey database, and a relevance of the final message for the final receiver is determined before sending the final message in the form of an individual estimated reaction value of the final receiver.

The steps one to thirteen may be carried out in the order described above. It is also possible to carry out a different order of the steps. The above presented order of the steps one to thirteen is only a particularly advantageous embodiment of the provided method. It is also possible to repeat some of the steps, particularly the sending of the final message. For example, several final messages may be sent to several final receivers, i.e. the step 13 may be carried out multiple times, for example thousandfold.

The provided method may be divided into three phases. In the first phase the influences of at least two parameters with respect to the first reaction behavior of the test receivers are determined. In the second phase by means of creating the survey database information is provided that enables adapting the final message, particularly the value of the selection parameter, which influences the content of the final message, to the read-out value of the first receiver feature.

In a third phase an adaption of the value of the selection parameter to the read-out value of the first receiver feature is carried out. This adaptation is carried out preferably in such a manner that the estimated reaction value of the final receiver is as high as possible. By means of this adaptation a probability that the final receiver receives an unimportant final message for him, may be reduced. Thus, it is possible to protect the final receiver from spam messages. Compared to a method, in which messages are examined for a relevance for the final receiver at the final receiver after receiving messages, the provided method may reduce a number of unimportant messages reaching the final receiver and therefore reduce a data traffic between the transmitter and the final receiver.

Particularly it may be provided that the final message is sent, if the estimated reaction value of the final receiver exceeds a predefined target reaction value and/or is equal to the predefined target reaction value. If the estimated reaction value of the final receiver undercuts the predefined target reaction value, the final message is preferably not sent. Thereby may be accomplished that relatively unimportant final messages do not reach the final receiver. This reduces the data traffic between the transmitter and several receivers, i.e. the final receivers, on the one hand. On the other hand, the final receiver may be protected from unimportant messages, particularly from spam messages.

Particularly, out of a set of possible final receivers, which may preferably be all receivers contained in the receiver database, only those final receivers, for which an individual estimated reaction value is greater than or equal to the target reaction value, are determined as final receivers.

The number of test receivers to survey receivers and survey receivers to possible final receivers itself behaves, for example, like 1 to 10 and 1 to 10 respectively. Other proportions may be 1 to 100 and 1 to 100 respectively, 1 to 100 and 1 to 1000 respectively, 1 to 1000 and 1 to 10,000 respectively. Particularly, the proportion of the number of possible final receivers to the number of final receivers being clearly above one may enable a reduction of the data traffic between the transmitter and the possible final receivers.

The number of test messages to survey messages and survey messages to final messages itself behaves, for example, like 1 to 10 and 1 to 10 respectively. Other proportions may be 1 to 100 and 1 to 100 respectively, 1 to 100 and 1 to 1000 respectively, 1 to 1000 and 1 to 10.000 respectively. Particularly, a high proportion of final messages to the sum of the test messages and the survey messages enables a reduction of the data traffic between the transmitter and the possible final receivers. This proportion may be 10 to 1, 100 to 1, 1000 to, up to one million to one.

The expression "module", as used herein, describes any known or later developed hardware, software, firmware, artificial intelligence, fuzzy-logic or combination of hardware and software that is able to execute the function associated with the respective "module".

In terms of the invention a final message is a message that is sent at least after a first sending of the test messages and a first sending of the survey messages. In the same manner it is provided that the final receiver receives the final message after the test receivers receive the first test messages and the survey receivers receive the first survey messages.

A first further embodiment may provide that after a first sending of the final message further survey messages are sent to the survey receivers, which already received survey messages, or to further survey receivers, wherein, for example, the final receiver may be a survey receiver. In doing so, it can be provided that no further test messages are sent between the sending of the final message and the further survey messages. The first further embodiment may have the advantage that the association provided by the survey database is improved by increasing the number of the survey data sets and thereby a saver estimation of the relevance of the final message for the final receiver is enabled.

A second further embodiment may provide that after a first sending of the final message further test messages are sent to the test receivers, which already received test messages, or to further test receivers, wherein, for example, the final receiver may be a test receiver. In doing so, it can be provided that no further survey messages are sent between the sending of the final message and the further test messages. The second further embodiment may have the advantage that the influence of the first and the second parameter may be determined again. This enables to select the selection parameter again when the method is applied repeatedly.

Preferably the transmitter is constructed as a distribution server. By means of the distribution server the messages, i.e. the test messages, the survey messages and the final message and preferably several final messages, are sent to the corresponding receivers, i.e. the test receivers, the survey receivers and the final receiver, preferably to several final receivers. The communication network comprises preferably a transmitter infrastructure, wherein the transmitter infrastructure is connected to the receiver infrastructure via an exchange device.

The transmitter infrastructure comprises the transmitter, the tracking server, the central server and the database server. The receiver infrastructure comprises at least an end device, preferably a computer, more preferably a user end device that is associated to a user. A preferred embodiment provides that the messages sent by the means of the distribution server may be received by the end device by means of a user of the end device. The end device comprises The transmitter infrastructure may be arranged, for example, in a building and the receiver infrastructure may be arranged in a further building. The exchange device is preferably the internet. A preferred embodiment provides that the transmitter infrastructure and the receiver infrastructure are arranged in the same building and the distribution server is constructed as a local network. Preferably the receiver infrastructure is spatially separated from the transmitter infrastructure, for example separated at least one kilometer from each other.

The receiver, i.e. the test receiver, the survey receiver and the final receiver and accordingly the final receivers may be respectively automated machines, for example a computer, on which a software is executed, with which the respective receiver automatically responds to the received test-, survey-, and/or final messages, or a user end device with a user interface, preferably a display, a touchpad and/or a keyboard, like for example a personal computer, a mobile phone, a smartphone or a laptop. In a preferred embodiment the receivers receive the test-, survey-, and/or final messages via e-mail traffic, SMS and/or Whatsapp-technology.

In a very particular embodiment of the method the receivers, i.e. the test receivers, the survey receivers and the final receiver are constructed as units, preferably as hardware units, of a computer. In this embodiment the exchange device is preferably constructed in the form of a bus system. The units can react automatically to test-, survey-, and/or final messages. Preferably, the units are self-learning systems, whose capabilities the transmitter does not have all the information at any given time. For that reason it is meaningful before sending to a possible final receiver to estimate his individual reaction value to the final message. If the final messages contain specific tasks, for example commands, which are supposed to be performed, it may be estimated by means of estimating the reaction value, if these tasks may be mastered by the corresponding final receiver.

In contrast to conventional communication methods in a computer, at which the capabilities of the individual units of the computer do not change or are completely known, in this particular embodiment the provided method may enable a communication from the transmitter to the final receiver even if the capabilities of the individual units are not completely known, like for example at self-learning units.

A preferred embodiment provides that the test receivers, the survey receivers and/or the final receiver are respectively designed as user devices associated to a user and the first receiver feature is designed as a user feature. Very preferably the user feature is a feature related to the user such as an age, a height, a gender or a behavior feature of the user. The behavior feature may be a daily time duration of a use of the receiver, a use of a specific medium, for example e-mail, SMS and/or Whatsapp when sending a response or when reacting in other ways to a test-, survey-, or final message. The embodiment of the method having the first receiver feature as a user feature enables that the user receives a smaller number of irrelevant messages for him and hence the user is provided a more efficient communication.

A message, i.e. a test-, survey-, or final message, may be an information of any kind, which is sent from the transmitter to a receiver, i.e. test-, survey-, or final receiver. The message may be an e-mail, an SMS, a Whatsapp-message, a push message or the like. The message may be an information, which is sent from the transmitter to one of the receivers, and is displayed on a monitor, touchscreen or display.

The message may be designed as a command in a computer language in a preferred embodiment. A particular embodiment provides that the receivers are constructed as computers of automated machines of a train of machines and the messages are tasks, for example production orders, for the respective automated machines, e.g. machine tools. In this embodiment the provided method may enable that a relevance of a task is estimated before the sending of the task and a task is sent only to those automated machines, for which a comparatively high relevance of the respective task was estimated. This type of method is especially suitable for trains of machines and accordingly automated machines, whose processes are determined by external temporarily changing factors, for example order receipts, weather conditions, energy- or commodity prices and/or externally determined material inflow streams. In this embodiment of the method, the first receiver feature may be an amount of idle capacities, for example work capacities, space capacities, material capacities.

In the context of the invention the relevance of the final message for the final receiver is determined in the form of the individual estimated reaction value of the final receiver. For example, depending on the urgency or importance of the final message, the final message is more or less relevant for the final receiver. According to the relevance the final receiver reacts to the final message, i.e. the final receiver may reply to the final message, for example, or ignore the final message and/or perform actions, which are in connection with the final message, for example an execution of a link in the final message.

The individual reaction behavior of the final receiver is determined as an individual estimated reaction value. The relevance of the final message for the final receiver is directly correlated to the estimated reaction value, i.e. at a comparatively high relevance a comparatively high individual estimated reaction value and at a comparatively low relevance a comparatively low individual estimated reaction value is existent. Thus, the relevance of the final message for the final receiver may be determined in the form of an individual estimated reaction value. For example, the relevance of the final message for the final receiver may be calculated by multiplication, for example by 1 or another weighting, with the individual estimated reaction value. The weighting may vary with respect to a value of the first receiver feature. Preferably, a change in the relevance may be determined by the determination of a change in the individual estimated reaction value.

The respective first message feature of the test messages, the respective first selection message feature of the survey messages and the final message feature of the final message may be a content element. The content element may be designed as a text element, such as a word, a phrase, a character or a sentence, a text module, an entirety of different text elements, an image element, such as a graphic, a photo of a video, or an entirety of different image elements. Accordingly, the first parameter and the selection parameter may be a size, a font, a language or a length of the text element or a proportion of a certain text element, for example a proportion of a sports message or information on pharmaceutical products, of the entirety of the different text elements, for example a entirety of a sports message, information on pharmaceutical products and technical data of a machine. Accordingly, the second parameter and the selection parameter may be a size, a color or a degree of sharpness of the image element of a proportion of a certain image element of the entirety of the different image elements.

In particular, the first and/or the second parameter and the selection parameter may have a value of zero. This corresponds, if the first and/or the second parameter is a length of the text element or a size of the image element, to the case that the respective content element is not contained in the corresponding test-, survey-, and/or final message. This embodiment of the method enables, in particular when using several parameters and several message features in the form of content elements, the generation of final messages, which comprise certain message features with a certain length and size respectively and do not comprise message features, whose length or size equals zero.

A preferred embodiment of the method provides that the first message feature $12a$ of the first test message $10a$ and the first message feature $12b$ of the second test message $10b$ is a content element and/or the first message feature $12c$ of the first third message $10c$ and the first message feature $12d$ of the fourth test message $10d$ is a content element.

For example, the first message feature of the first and the second test message may be respectively a content element in the form of a text element and the first message feature of the third and the fourth test message a content element in the form of an image element. For example, the first parameter may be a size of the text element and the second parameter may be a color of the image element. If the first parameter or the second parameter is changed, i.e. it reaches different values, this is accompanied respectively by a change in the size of the text element and by a change in the color of the image element respectively. Preferably a change in the first message feature of the first and the second test message and the first message feature of the third and the fourth test message is describable, preferably characterizable and preferably reproducible, in particular unambiguously reproducible, by means of a change in a value of the first parameter and a value of the second parameter respectively.

In the sense of the invention a state of the first message feature of the first and second test message by means of the first parameter and a state of the first message feature of the third and fourth test message by means of the second parameter is describable, preferably characterizable and preferably reproducible, in particular unambiguously reproducible, wherein different states of the first message feature of the first and second test message correspond to different values of the first parameter and different states of the first message feature of the third and fourth test message correspond to different values of the second parameter.

In a preferred embodiment of the method it is provided that the content element of the first test message and/or third test message comprises at least partially the identical content as the content element of the second test message and the fourth test message respectively. For example, the first message feature of the first test message may be a content element in the form of a text element and the first message feature of the second test message may be a content element in the form of a text element, wherein the two text elements comprise at least partially the identical content and one of the two text elements is shortened compared to the other. A concordance of content elements with regards to content has the advantage that an influence value of the first or second parameter may be determined independently of a content of a test message and thus more exactly.

A further advantageous form of the previous embodiment of the method provides that the first selection message feature of the survey messages and the final message feature each are content elements and comprise at least partially the identical content. In this embodiment of the method, for example, the first selection feature and the final message feature may each be a text element and the final message feature only comprises parts of the text element of the selection message, wherein the parts are changed in size, length, color and/or font in such a manner that the final message has a highest possible relevance for the final receiver.

Furthermore, the first selection message feature of the survey messages, the final message feature and the first and the second message features of the test messages may each be content elements, wherein the final message feature comprises only parts of the particular message feature of the test messages which is changeable by means of change in the selection parameter. In this embodiment of the method the first and the second parameter are preferably parameter, which respectively describe a size of the first and the second message features, such as a text length of an image size. This special embodiment of the method preferably provides for setting the particular parameter that was not defined as a selection parameter to zero when generating the selection message and/or the final message. In this case, the corresponding message feature, whose respective parameter was not defined as selection parameter, is not contained in the selection message and/or the final message. In this way, message features that are not relevant for a final receiver may be eliminated.

A further embodiment may provide that the first message feature of the first test message and the second test message is a time value and/or the first message feature of the third test message and the fourth test message, the respective first selection message feature of the survey messages and the final message feature of the final message is a time value. The time value may be a date and/or a time of day, for example at which the respective test-, survey-, and/or final message is sent. The time value may also be a time delay, which is existent between a sending of a test message and a sending of a survey message or a final message, or which is existent between a sending of a survey message and a final message.

In the third step of the proposed method the first reaction behavior with respect to the test messages is detected by means of the tracking server. The first reaction behavior is preferably detected in such a way that a respective individual first reaction behavior of the respective test receiver is detected and the individual first reaction behaviors of the test receivers as a whole form the first reaction behavior. A respective individual first reaction behavior of the test receivers may preferably be detected as a signal, a signal sequence and/or a message, which is sent form the respective test receiver to the tracking server. For example, a respective individual first reaction behavior may be generated in the form of a response to a received test message or an executed action in a menu of a user interface of the test receiver following receiving of the test message.

A further embodiment provides that the first and the second test message and/or the third and the fourth test message instead of only one test message respectively is sent to a respective test receiver. This may have the advantage that with a small number of test receivers, for example less than one hundred test receivers, the influence value of the first and second parameter may be determined saver, particularly statistically significantly.

Preferably the test messages are sent to several test receivers, for example to one hundred test receivers. This has the advantage that the influence of a receiver feature, for example the first receiver feature, on the first reaction behavior may be reduced. Preferably several, preferably all, test messages are sent to several, preferably all, test receivers and the first reaction behavior is detected by means of an averaging of the individual first reaction behavior of the respective test receiver.

Preferably a test data set is created for at least some of the test receivers respectively, wherein an identification feature, such as for example an IP address of a respective test receiver, is assigned to a first reaction behavior to a respective received test message of the test receiver and to a value of the selection parameter of the respective received test message.

In the fourth step of the proposed method the first reaction behavior is evaluated by means of the evaluation module. The first reaction behavior is preferably evaluated in such a manner that a respective individual first reaction behavior of the respective test receiver is evaluated. Preferably a qualitative or a quantitative evaluation is carried out in the evaluation of the individual first reaction behaviors. The quantitative evaluation preferably provides for determining a single individual first reaction behavior.

The evaluation may comprise a reaction time with which the respective test receiver reacts to the test message after receiving a test message. In a qualitative evaluation, if the reaction time is short, for example less than three days, the individual first reaction behavior may be evaluated as good, and if the reaction time is long, for example longer than or exactly three days, the individual first reaction behavior may be evaluated as poor.

For example, in the case of a quantitative evaluation of the individual first reaction behavior, if the reaction time is less than one day, the individual first reaction behavior may be evaluated with a single first reaction value of 10, and if the reaction time is longer than 10 days, the individual first reaction behavior may be evaluated with a single first reaction value of one. If the reaction time is between one and ten days, an interpolation of the individual first reaction value preferably is executed.

In a further embodiment the evaluation of the individual first reaction behavior comprises a tracking of a reaction of the respective test receiver following receiving of the test message. In a preferred embodiment the tracking may comprise recording an action on a web page on which the test receiver was directed via the test message, calling the web page itself and/or opening the test message.

A possible variant of the tracking is described below. When sending the messages, i.e. the test, survey or final messages, a user ID is assigned to each receiver, i.e. test, survey or final receiver, whose address is known, e.g. in the form of an e-mail address. This user ID is preferably contained in the form of information, for example an encoding, in a link to a web page which the message contains. As well, the link contains information about the type of message the receiver has received. For example, the link may contain information, which indicates the value of the first and/or second parameter of the test message or survey message and indicates, if a test message of a survey message was received. During a calling of the web page via the link, the information, which is contained in the link, is sent to a web server on which the web page is hosted.

Furthermore, an action data set is preferably generated and preferably logged by means of the web server in which recorded actions, which were executed on the web page, are saved. The action date set preferably comprises an assignment of the user ID to the saved actions. The information contained in the link and/or the action data set is sent from the web server to the tracking server in the form of a feedback. When detection the first and/or second reaction behavior, a first and/or second reaction behavior may be assigned to a specific user ID on the basis of the feedback from the web server. In particular, it may be determined on the basis of the user ID what action the respective receiver has performed in relation to a received message, i.e. whether the receiver has called the web page and which actions the receiver has performed on the web page.

A point system may be provided for the evaluation of the individual first reaction behavior, which increases an individual first reaction value of the individual reaction behavior by a specified number of points depending on the reaction of the test receiver. For example, when opening the test message the individual first reaction value may be increased by one point, when calling a web page specified in the test message, the individual first reaction value may be increased by two points, when a first action is performed on the specified web page, the individual first reaction value may be increased by three points, and when a second action is performed on the specified web page, the individual first reaction value may be increased by three points. A preferred embodiment provides that the evaluation of the individual first reaction behavior of the test receiver lasts a specified time, for example 10 days, 10 hours, 10 minutes or 10 seconds.

In a fifth step, the influence value of the first and the second parameter is determined. Preferably, a key figure is determined by means of which an influence of the first parameter and the second parameter on the first reaction behavior of the test receivers may be determined. In this step, a correlation between a change in a value of the first parameter or the second parameter and a change in the first reaction behavior of the test receivers is preferably determined.

An embodiment of the proposed method provides that the test messages are generated in such a manner that the first test message comprises a second message feature, the second test message comprises a second message feature, the third test message comprises a second message feature, and the fourth test message comprises a second message feature and the second message feature of the first and the second test message is each changeable by means of a change respectively in a value of the second parameter and the second message feature of the third and the fourth test message is each changeable by means of a change respectively in a value of the first parameter and the values of the first and the second parameter of the test messages are each values in a narrow range of an extreme value of a respective value range of the parameters. This variant of the creation of the test messages is referred to in the following as the combined extreme value variant. In particular, a narrow range comprises values at a distance from the respective extreme value of approximately up to ten percent of the total value range of the parameter.

The value range of the first parameter is limited downwards by a first minimum value and upwards by a first maximum value and the value range of the second parameter is limited downwards by a second minimum value and upwards by a second maximum value. In particular, the values of the first and second parameter of the test messages are either minimum or maximum values of the value range of the first and the second parameter respectively. By generating the test messages according to the combined extreme value variant, a number of test messages may be significantly reduced compared to generating the test messages according to which a respective test message only comprises one message feature which may be changeable by means of a change in the first or second parameter in order to determine the respective influence value of the first and second parameter with the same accuracy. Hence, an application of the combined extreme value variant may reduce the data traffic in the communication network between the transmitter and the test receivers.

A very advantageous embodiment of the combined extreme value variant provides for a generation of the test messages according to the following variant, which in the following is referred to as the combined quadruple extreme value variant.

The first parameter of the first message feature of the first test message comprises a value in a narrow range of the first maximum value, preferably the first maximum value, and the second parameter of the second message feature of the first test message comprises a value in a narrow range of the second minimum value, preferably the second minimum value.

The first parameter of the first message feature of the second test message comprises a value in a narrow range of the first minimum value, preferably the first minimum value, and the second parameter of the second message feature of the second test message comprises a value in a narrow range of the second maximum value, preferably the second maximum value.

The second parameter of the first message feature of the third test message comprises a value in a narrow range of the second minimum value, preferably the second minimum value, and the first parameter of the second message feature of the third test message comprises a value in a narrow range of the first minimum value, preferably the first minimum value.

The second parameter of the first message feature of the fourth test message comprises a value in a narrow range of the second maximum value, preferably the second maximum value, and the first parameter of the second message feature of the fourth test message comprises a value in a narrow range of the first maximum value, preferably the first maximum value.

By generating the test messages according to the model of the combined quadruple extreme value variant, a high number of combinations of the possible values of the two parameters for the corresponding first and second message features may be represented by a minimal number of test messages. Therefore, the combined quadruple extreme value variant enables to determine the influence of the first and second parameter on the first reaction behavior with as few test messages as possible and enables a further reduction of the data traffic between the transmitter and the test receivers compared with the combined extreme value variant.

In an advantageous manner, in addition to the first test message, several firsttestmessages are sent to further test receivers beside to the first, second, third and/or fourth test receiver, wherein the firsttestmessages comprise the same values for the first and the second parameter of the corresponding first and second message feature of the firsttestmessages as the first test message.

Likewise, preferably in addition to the second test message, several secondtestmessages are sent to further test receivers beside to the first, second, third and/or fourth test receiver, wherein the secondtestmessages comprise the same values for the first and the second parameter of the corresponding first and second message feature of the secondtestmessages as the second test message.

Likewise, preferably in addition to the third test message, several thirdtestmessages are sent to further test receivers beside to the first, second, third and/or fourth test receiver, wherein the thirdtestmessages comprise the same values for the first and the second parameter of the corresponding first and second message feature of the third test messages as the thirdtestmessage.

Likewise, preferably in addition to the fourth test message, several fourthtestmessages are sent to further test receivers beside to the first, second, third and/or fourth test receiver, wherein the fourthtestmessages comprise the same values for the first and the second parameter of the corresponding first and second message feature of the fourth test messages as the fourthtestmessage.

Preferably, the reactions of the test receivers are detected, preferably sorted, by means of the tracking server in such a manner that for each test receiver it is known to which test message this reacted.

Furthermore, as described above the respective individual first reaction behavior is preferably evaluated and an individual first reaction value is determined preferably for each test receiver. In the present case, a high reaction value may describe a strong or good reaction behavior and a low reaction value may describe a weak or bad reaction behavior.

Advantageously, a first mean reaction value for all individual first reaction values of the test receivers that have respectively received a firsttestmessage or the first test message is created. Likewise, a second mean reaction value for all individual first reaction values of the test receivers that have respectively received a secondtestmessage or the second test message may be created. Furthermore, a third mean reaction value for all individual first reaction values of the test receivers that have respectively received a thirdtestmessage or the third test message may be created. Likewise, a fourth mean reaction value for all individual first reaction values of the test receivers that have respectively received a fourthtestmessage or the fourth test message may be created.

Furthermore, a first positive influence value is preferably created, which corresponds to half of the sum of the first mean reaction value and the fourth mean reaction value. Furthermore, a first negative influence value is preferably created, which corresponds to half of the sum of the second mean reaction value and the third mean reaction value. Furthermore, a second positive influence value is preferably created, which corresponds to half of the sum of the second mean reaction value and the fourth mean reaction value. Furthermore, a second negative influence value is preferably created, which corresponds to half of the sum of the first mean reaction value and the third mean reaction value.

Preferably, the influence value of the first parameter for determining the influence of the first parameter on the first reaction behavior is determined such that the first influence value of the first parameter corresponds to the absolute value of the difference between the first positive influence value as minuend and the first negative influence value as subtrahend. Preferably, the influence value of the second parameter for determining the influence of the second parameter on the first reaction behavior is determined such that the second influence value of the second parameter corresponds to the absolute value of the difference between the second positive influence value as minuend and the second negative influence value as subtrahend.

Then, the influence value of the first parameter is compared to the influence value of the second parameter in the sixth step of the proposed method. According to a special embodiment of the method the particular parameter comprising the higher influence value has the higher influence on the first reaction behavior. The parameter of the two parameters, the first and the second parameter, with the greater influence on the first reaction behavior is determined as the selection parameter by means of the selection module.

After creating the survey messages in the seventh step, in the eight step of the method the survey messages are sent to the survey receivers by means of the transmitter. A respective survey receiver may also be a test receiver. Preferably the survey receivers are different from the test receivers. The survey receivers can be distinguished at least by the first receiver feature. The first receiver feature may be a machine type, an age of a person, a person's gender, a location, person's level of experience in a particular area, or any other feature suitable for classification.

The value of the selection parameter of the first selection message feature of the first survey message is different from the value of the selection parameter of the first selection message feature of the second survey message. This means that the state of the first selection message feature of the first survey message is different from the state of the first selection message feature of the second survey message. This may be the case if the two first selection message features of the two survey messages comprise the same content, and on the other hand also, if they do not comprise the same content.

In the tenth step the second reaction behavior to the survey messages is evaluated by means of the evaluation module. The second reaction behavior corresponds to the reaction behavior of the survey receivers to the survey messages. An evaluation of the second reaction behavior may be carried out in an advantageous variant in the same way as an evaluation of the first reaction behavior.

Preferably, the second reaction behavior is evaluated in such a way that a respective individual second reaction behavior of the respective survey receivers is evaluated. In advantageous ways a qualitative or a quantitative evaluation is carried out during the evaluation of the individual second reaction behavior, as described above for the evaluation of the individual first reaction behavior. In particular, the individual second reaction behavior of the respective survey receiver may be carried out according to the point system proposed for the evaluation of the individual first reaction behavior. Particularly advantageously, an individual second reaction value is determined for each received survey message. The individual second reaction values may be determined in the same way as the individual first reaction values described above.

Preferably, an individual reaction survey value is determined for each received survey message. The respective survey reaction value of a respective survey receiver may be determined like a single first reaction value of a test receiver.

In the eleventh step, respectively one survey data set for at least two survey receivers is created and then stored in the survey database, wherein the respective survey data set comprises a value of the first receiver feature of the respective survey receiver, an evaluation of a corresponding individual second reaction behavior of the respective survey receiver and a corresponding value of the selection parameter of the survey message received by the respective survey receiver.

The evaluation of the corresponding individual second reaction behavior of the respective survey receiver may be, for example, the individual survey reaction value of a survey receiver. In the case of a qualitative evaluation of the individual second reaction behavior, the evaluation as a string, for example "good", "medium", or "bad", may be present in a survey data set. In the case of a qualitative evaluation of the individual second reaction behavior, the evaluation as a survey reaction value, for example "100", "50", or "0", may be present in a survey data set.

A particular embodiment provides that the communication network comprises an approximation module, wherein a functional relationship is established between the values of the first receiver feature of the survey receivers, the evaluations of the corresponding individual second reaction behavior of the survey receivers, and the corresponding values of the selection parameter of the survey messages received by the survey receivers is approximated by means of the approximation module.

In particular, a reaction function may be approximated which, depending on a value of the first receiver feature as first input variable and a value of the selection parameter as second input variable, has a value which corresponds to an individual estimated reaction value of a receiver.

The approximation module may comprise a neuronal network and/or a polynomial function with at least one composite polynomial. For approximation, preferably a part of the survey data sets or all survey data sets of the survey database may be used as training data sets. In this way, the approximation is performed on the basis of the association of the values of the first receiver feature with the values of the selection parameter and with the evaluations of the individual second reaction behavior provided by the survey database.

Preferably, the respective training data sets are divided in such a way that the respective value of the first receiver feature corresponds to a first input signal, the respective value of the selection parameter corresponds to a second input signal and the respective individual survey reaction value of the training data set corresponds to the, preferably single, output signal of the approximation module.

The approximation module comprises several parameters. Depending on which values these parameters assume, an output signal is calculated on the basis of a first input signal and a second input signal.

During a training of the approximation module, an output signal, which is directly related to the values of the parameters of the approximation module, is calculated on the basis of the value of the first receiver feature as first input signal and the value of the selection parameter as second input signal. Then, a deviation value is calculated on the basis of the calculated output signal and the individual survey reaction value, preferably in the form of a difference, wherein the particular individual survey reaction value is used, which is stored in the same survey data set as the value of the first receiver feature and the value of the selection parameter on the basis of which the output signal was calculated. Preferably, a deviation value is calculated for all training data sets and preferably all deviation values are added up to a mean deviation. The mean deviation is differentiated particularly advantageously with respect to the parameters of the approximation module, particularly of the neuronal network and the polynomial function respectively, and a corresponding derivative value is determined and for each parameter a respective change value of the parameter is determined, which is preferably directly proportional to the corresponding derivative value.

Subsequently, the individual parameter of the approximation module, particularly of the neuronal network and the polynomial function respectively, are changed by the respective change value. This is a preferred variant of the training of the approximation module, particularly of the neuronal network and the polynomial function respectively. Other variants of training may include a Hebb rule, a Delta rule, backpropagation training and/or competitive learning.

The functional relationship between the first receiver feature, the selection parameter and the evaluation of the second reaction behavior is approximated by means of the training of the approximation module described above and such an approximated functional relationship is stored in the form of the parameter of the approximation module available at the end of the training, preferably in a modelling database, preferably on the database server.

A particular embodiment provides that it is checked whether the values of the first receiver feature have an influence on the evaluations of the respective individual second reaction behavior of the survey receivers. Such a check is preferably carried out after the twelfth step of the proposed method. This check may be carried out, for example, by means of a data analysis of the survey data sets stored in the survey database. Furthermore, this may be carried out by operating the approximation module after the training with alternating different values of the first receiver feature as the first input variable and a constant first value of the selection parameter as the second input variable in a first loop. If the output value of the approximation module does not change or changes only insignificantly, i.e. in the range of approximately five percent, a very small influence of the first receiver feature may be detected for the constantly held value of the selection parameter.

The approximation module is then operated at a second constant value of the selection parameter different from the first, with alternating different values of the first receiver feature as the first input variable. This procedure is repeated for several different values of the selection parameter and for each value of the selection parameter it is checked whether a very small influence of the first receiver feature is existent, and if the small influence is existent this is recorded.

If a small influence was detected for a large part of the values of the selection parameter, for example over ninety percent of a value range of the selection parameter, it is concluded that the values of the first receiver feature have on the whole a very small influence on the evaluations of the respective individual second reaction behavior of the survey receivers. In this case, a second receiver feature is selected from the receiver database and the eight to thirteen, preferably the steps eight to twelve, of the proposed method are executed repeatedly with the second receiver feature instead of the first receiver feature. With the help of this particular embodiment of the method, which includes checking the influence of the first receiver feature, the most influential receiver feature may be selected from many possible receiver features, whereby the final messages may be better adapted to the final receivers and thus the sending of irrelevant final messages to possible final receivers may be avoided.

In the thirteenth step the final message is sent to the final receiver, wherein the value of the selection parameter corresponding to the value of the first final message feature is adapted to the value of the first receiver feature of the final receiver on the basis of the association of the values of the first receiver feature with the values of the selection parameter and with the evaluations of the individual second reaction behavior. Preferably, the approximated functional relationship is used for adapting the value of the selection parameter. A simple variant may also provide to use the association provided by the survey database as a look-up table to perform an adaptation in the form of a readout and interpolation.

A preferred embodiment provides that the value of the selection parameter corresponding to the first final message feature is adapted to the value of the first receiver feature of the final receiver such that the individual estimated reaction value is adapted to a target reaction value, preferably that the individual estimated reaction value is approximately equal to the target reaction value. This can be done, for example, in such a way that an output signal corresponding to the individual estimated reaction value is calculated by means of the approximation module on the basis of the value of the first receiver feature of the final receiver and a value of the selection parameter. If this individual estimated reaction value deviates from the target reaction value, for example is less than the target reaction value in terms of the absolute value, the value of the selection parameter is changed and an output signal is calculated again. This process is preferably repeated until the calculated output signal is greater than in terms of the absolute value or within the limits of a tolerance range of, for example, one percent similar in quantity to the predetermined target reaction value and is thus adapted to the predefined target reaction value.

This adaptation of the value of the selection parameter is referred to in the following as iterative adaptation. In doing so, the value of the selection parameter as second input signal is changed at each restart and the value of the first receiver feature of the final receiver as first input signal is kept constant.

In an advantageous way a final message is sent to several final receivers respectively, wherein the respective final messages are created in the same way as the final message described above. In doing so, in the same way as for the final receiver described above, the value of the first receiver feature of the respective final receiver is respectively read from the receiver database and presented to the approximation module as first input signal.

In principle, the opens up the possibility to send a final message only to those final receivers for whom the individual estimated reaction value is at least as great as the target reaction value. Due to the approximated functional relationship, it is possible that for some values of the first receiver feature a predefined target reaction value cannot be reached even for all possible values of the selection parameter.

Preferably, when iteratively adapting the value of the selection parameter to the value of the first receiver feature a change in the value of the selection parameter is reduced or increased step by step. A gradient method may also be provided when changing the value of the selection parameter, in which the change in the value of the selection parameter is calculated as a function of a change in the deviation of the individual estimated reaction value from the target reaction value. In doing so, the change in the value of the selection parameter may be calculated directly proportional to the change in the deviation of the individual estimated reaction value.

As described above, the functional relationship may be described by the reaction function.

An approximation of the reaction function by means of the neuronal network has the advantage over an approximation of the reaction function by means of one or more polynomial functions that the reaction function approximated by means of the neuronal network may comprise a smoother function course. This is advantageously achieved if the neuronal network comprises a tangent hyperbolic function. Preferably, the neuronal network comprises one activation function, preferably several activation functions, which are advantageously a tangent hyperbolic function. Compared to a polynomial function, a tangent hyperbolic function a smoother functional surface of the approximated relationship can be achieved. The smoother functional surface makes it easier to use the gradient method when adapting the value of the first receiver feature. For certain constellations of training data, both an approximation of the functional relationship and an adaptation of the value of the selection parameter to the value of the first receiver feature may only be possible by means of the neuronal network.

In addition to the first receiver feature, further receiver features may also be used. In the same way, in addition to the selection parameter described above and the first selection feature and the final message feature, several selection parameters and respectively several selection message features and final message features may be used. In the same way, in addition to the first and second message feature of the messages further message features, which may be changeable by means of further parameters, may also be used.

A particular advantage of the invention is that the respectively individually estimated reaction value is determined before the sending of the final message of the final messages to the final receiver and the final receivers respectively, preferably by means of the approximation module and even more preferably by means of the neuronal network.

Thereby, it can be prevented that messages that have little or no relevance for the final receiver and the final receivers respectively are sent to the final receiver and the final receivers respectively in the first place. Thereby, the data traffic between the transmitter and the final receiver in the communication network may be reduced.

This advantage may be achieved particularly well it the approximation module is locally arranged closer to the transmitter than to the receiver and the final receiver respectively within the communication network. In particular, the approximation is arranged between a distribution node, from which the messages are sent to the respective receivers, and the receiver database within the communication network. Such an arrangement of the approximation module enables that a large number of test messages and survey messages may be sent to the receivers, particularly to all receivers stored in the receiver database, and an equally large number of reactions of the receivers may be detected.

The higher this number is, the better the functional relationship between the first receiver feature, the selection parameter and the second reaction behavior may be approximated by means of the approximation module. Compared to a variant in which the approximation module is arranged in the immediate vicinity of a receiver and not ahead of the distribution node, a more precise approximation of the functional relationship between the first receiver feature, the selection parameter and the second reaction behavior may be enabled. Advantageously, the approximation module is arranged in the immediate vicinity of the transmitter, for example in the same room.

In order to achieve a further reduction of the data traffic in the communication network, it may be provided that a number of final messages is significantly higher, for example, ten, one hundred, or over one thousand times higher than a number of test and/or survey messages. It is possible that on the basis of the generated survey database, which is created with a comparatively small number of survey and test messages, a comparatively higher number of final receivers is determined for whom a corresponding final message has too little relevance and is therefore not sent to them. Thus the sum of the messages in the communication network can be reduced.

In principle, the invention opens the possibility that the final message is selected from a set of messages, which preferably originate from several information sources, wherein the messages each comprise a message feature and the respective message features comprise different values of the selection parameter and the value of the selection parameter of the final message is adapted to the value of the first receiver feature.

The information sources may be social networks, blogs, Twitter accounts, news services and/or discussion forums. Preferably, a comparative value of the selection parameter is determined before selecting the final message. The comparative value is preferably calculated for a target reaction value and the value of the first receiver feature of the final receiver using the iterative adaptation described above by means of the approximation module. Preferably, the message whose value of the selection parameter is closest to the calculated comparative value is selected as the final message. By the use of the iterative adaptation of the comparative value and the selection of the final message as a function of the comparative value, the value of the selection parameter of the final message is adapted to the value of the first receiver feature.

Furthermore, it is in the context of the invention that the final message is generated by means of the central server. Here, the final message may be composed of individual, preferably also separated, message features. For example, the final message may comprise the first message feature and/or the second message feature.

In the following, an exemplary application of the method is described. All variants of the exemplary application described herein are transferable to the proposed method. According to the example, the test messages are generated in the first step of the method in such a way that the first, second, third and fourth test messages respectively comprise in a simple variant a first message feature. The first message feature of the first and second test message is a text and the third and fourth message feature of the third and fourth test message is an image.

The text is changeable by the first parameter, wherein the first parameter is a text length. The first test message comprises the text in a greater length and the second test message comprises the text in a smaller length, i.e. the text appears shortened in the second text message compared to the first text message.

The image is changeable by the second parameter, wherein the second parameter is an image size. The third test message comprises the image in a smaller image size and the fourth test message comprises the image in a larger image size. In this example, the image is to be presented completely in both test messages. In a further variant it is also possible that with a smaller image size only a section of the image is presented.

In the second step, the four test messages are sent to a single test receiver or to several, for example, four or one thousand, test receivers. In the following the variant is considered in which the four test messages are sent to several test receivers.

The first reaction behavior is determined in the third step and evaluated in the fourth step. During the evaluation it is checked whether a link, which is located below the text or the image, has been clicked. This is checked for each individual test message sent and a click rate is determined for each message type, i.e. for the first, second, third and fourth test message. In the fifth step it is determined whether an influence value of the first and the second parameter determines the click rate. Here, a quotient of a change in the click rate as dividend and a change in the respective parameter as divisor may be determined as influence value respectively. In the sixth step, the parameter that has the greatest influence on the first reaction behavior is determined as the selection parameter, which in this case is the particular parameter with the greatest quotient.

In the seventh step, several survey messages are generated, which comprise respectively a first selection feature. The first selection feature may be the same text or the same image that is contained in the test messages. It is essential for the invention that the first selection message feature of each survey message is changeable by means of a change in the respective corresponding value of the selection parameter. It is therefore possible that a different text or a different image is contained in the survey messages compared to the test messages.

Depending on which of the two parameters was determined as the selection parameter, the message feature corresponding to the selection parameter is selected as the selection message feature. For example, if the text length is determined as selection parameter, the selection message feature is a text, preferably the same text, which is contained in the test messages. If, on the other hand, the image size is determined as selection parameter, the selection message feature is an image, preferably the same image, which is contained in the test messages. In the following, it is assumed that the same text or image is selected as selection message feature.

In the eighth step, the survey messages are sent to several survey receivers. In the following, it is assumed that one hundred different survey messages are sent to five hundred survey receivers, wherein the survey messages differ in that the value of the selection parameter is different, i.e. the text and the image respectively is different in length and size respectively. Furthermore, the survey receivers are distinguishable from at least one first receiver feature. In the following, it is assumed by way of example that the survey receivers are distinguishable from the age.

In the ninth step, the second reaction behavior of the survey receivers is detected. In the following, it is assumed by way of example that it is checked whether the survey receivers have clicked on the link and whether an action was performed on the linked web page. In the tenth step, the second reaction behavior is evaluated. Here, for each survey message sent, an evaluation of an individual second reaction behavior of the respective survey receiver which has received the corresponding survey message is carried out. For each survey message received a survey reaction value is determined, which takes the value one when clicking, the value two when clicking and performing an action on the linked web page, the value three when clicking and performing two actions, and so on.

In the eleventh step, for each survey message received, a survey data set is created which comprises the value of the first receiver feature, i.e. the age of the survey receiver, i.e. the value of the selection parameter, i.e. the text length and the image size respectively and the determined survey reaction value of the received survey message, i.e. the evaluation of a respective individual second reaction behavior of the respective survey receiver, which has received the survey message. The survey data sets are stored in the survey database in the twelfth step.

In the thirteenth step the final message is sent to many final receivers, for example to one hundred receivers. In a first variant of the method the final message is created by means of the central server. Here, a value of the first receiver feature of the final receiver, i.e. the age, is read from the receiver database. The final message comprises at least a first final message feature, which is changeable by means of a change in the value of the selection parameter.

Depending on which of the two parameters was determined as the selection parameter, the message feature corresponding to the selection parameter is selected as the final message feature. For example, if the text length is determined as selection parameter, the final message feature is a text, preferably the same text, which is contained in the test messages. If, on the other hand, the image size is determined as selection parameter, the final message feature is an image, preferably the same image, which is contained in the test messages. In the following, it is assumed that the same text or image is selected as final message feature. However, in another variant, the final message feature may comprise a different content than the selection message feature or may comprise the message feature of a test message. It is important for the invention that the final message feature is changeable by means of a change in a value of the selection parameter.

When generating the final message, the value of the selection parameter is adapted to the read-out value of the first receiver feature. The adaptation may be carried out in such a way that on the bases of an initial value of the selection parameter, an individual estimated reaction value of the final receiver is determined on the basis of the association provided by the survey database, for example by means of the approximation module. If the estimated reaction value takes a value below a target reaction value, the initial value of the selection parameter is changed. This procedure is repeated until the individual estimated reaction value is equal or greater than the target reaction value. Then, the final message is sent to the final receiver. If, after a specified number of repetitions of the process, the individual estimated reaction value is lower than the target reaction value, the respective final receiver does not receive any final message. This is carried out for each of the one hundred final receivers.

Furthermore, a nonvolatile computer-readable information storage medium with stored information is proposed, wherein the information causes when executed by a processor the execution of the steps one to thirteen of the proposed method.

Furthermore a communication network for determining a relevance of a final message for a final receiver before sending the final message is proposed. The communication network comprises a first test receiver, a second test receiver, a third test receiver and/or a fourth test receiver, a first survey receiver, a second survey receiver and/or a third survey receiver, a final receiver, a receiver database, a survey database.

The communication network furthermore comprises a central server that generates a first test message, a second test message, a third test message and a fourth test message, wherein each test message comprises at least one first message feature, and the first message feature of the first test message and the first message feature of the second test message are changeable by means of a change in a respective corresponding value of a first parameter, and the first message feature of the third test message and the first message feature of the fourth test message are changeable by means of a change in a respective corresponding value of a second parameter, and the respective corresponding values of the first parameter are different and the respective corresponding values of the second parameter are different.

The communication network furthermore comprises a transmitter that sends the first test message, the second test message, the third test message, and the fourth test message to the first test receiver, the second test receiver, the third test receiver, and/or the fourth test receiver.

The communication network furthermore comprises a tracking server that detects a first reaction behavior with respect to the test messages.

The communication network furthermore comprises an evaluation module that evaluates the first reaction behavior and determines an influence value of the first parameter, which detects an influence of the first parameter on the first reaction behavior, and an influence value of the second parameter, which detects an influence of the second parameter on the first reaction behavior.

The communication network furthermore comprises a selection module that compares the influence value of the first parameter to the influence value of the second parameter and determines a selection parameter, wherein the particular one of the two parameters, the first parameter and the second parameter that has the greater influence on the first reaction behavior is the selection parameter.

The central server generates at least one first survey message, a second survey message and preferably a third survey message wherein the survey messages respectively comprise at least one first selection message feature, the respective first selection message feature is changeable by means of a change in a respective corresponding value of the selection parameter and the value of the selection parameter of the first selection message feature of the first survey message is different from the value of the selection parameter of the first selection message feature of the second survey message.

The transmitter sends the first survey message, the second survey message and preferably the third survey message at least to the first survey receiver, the second survey receiver, and/or the third survey receiver, wherein the survey receivers are distinguishable by at least one first receiver feature.

The tracking server detects a second reaction behavior with respect to the survey messages. The evaluation module evaluates the second reaction behavior. The central server creates a respective survey data set for at least two survey receivers wherein the respective survey data set comprises a value of the first receiver feature of the respective survey receiver, an evaluation of a corresponding second reaction behavior of the respective survey receiver and a corresponding value of the selection parameter of the survey message received by the respective survey receiver.

The central server stores at least two of the survey data sets in the survey database on the database server, wherein the survey database by means of the survey data sets stored therein provides an association of the values of the first receiver feature with the values of the selection parameter and with the evaluations of the individual second reaction behavior.

The transmitter sends the final message to the final receiver and the central server reads out a value of the first receiver feature of the final receiver from the receiver database, wherein the final message comprises at least one first final message feature, the first final message feature is changeable by means of a change in a corresponding value of the selection parameter and the value of the selection parameter is adapted to the read-out value of the first receiver feature of the final receiver by means of the association provided by the survey database and a relevance of the final message for the final receiver is ascertainable in the form of an individual estimated reaction value before sending the final message.

Furthermore a transmitter infrastructure for determining a relevance of a final message for a final receiver before sending the final message in a communication network is proposed. The transmitter infrastructure comprises receiver database 6 and a survey database.

The transmitter infrastructure furthermore comprises a central server that generates a first test message, a second test message, a third test message and a fourth test message, wherein each test message comprises at least one first message feature, and the first message feature of the first test message and the first message feature of the second test message are changeable by means of a change in a respective corresponding value of a first parameter, and the first message feature of the third test message and the first message feature of the fourth test message are changeable by means of a change in a respective corresponding value of a second parameter, and the respective corresponding values of the first parameter are different and the respective corresponding values of the second parameter are different.

The transmitter infrastructure furthermore comprises a transmitter that sends the first test message, the second test message, the third test message, and the fourth test message to a first test receiver, second test receiver, third test receiver, and/or a fourth test receiver.

The transmitter infrastructure furthermore comprises a tracking server that detects a first reaction behavior with respect to the test messages.

The transmitter infrastructure furthermore comprises an evaluation module that evaluates the first reaction behavior and determines an influence value of the first parameter, which detects an influence of the first parameter on the first reaction behavior, and an influence value of the second parameter, which detects an influence of the second parameter on the first reaction behavior.

The transmitter infrastructure furthermore comprises a selection module that compares the influence value of the first parameter to the influence value of the second parameter and determines a selection parameter, wherein the particular one of the two parameters, the first parameter and the second parameter that has the greater influence on the first reaction behavior is the selection parameter.

The central server generates at least one first survey message, a second survey message and preferably a third survey message wherein the survey messages respectively comprise at least one first selection message feature, the respective first selection message feature is changeable by means of a change in a respective corresponding value of the selection parameter and the value of the selection parameter of the first selection message feature of the first survey message is different from the value of the selection parameter of the first selection message feature of the second survey message.

The transmitter sends the first survey message, the second survey message and preferably the third survey message at least to one first survey receiver, a second survey receiver, and/or a third survey receiver, wherein the survey receivers are distinguishable by at least one first receiver feature.

The tracking server detects a second reaction behavior with respect to the survey messages. The evaluation module evaluates the second reaction behavior. The central server creates a respective survey data set for at least two survey receivers wherein the respective survey data set comprises a value of the first receiver feature of the respective survey receiver, an evaluation of a corresponding second reaction behavior of the respective survey receiver and a corresponding value of the selection parameter of the survey message received by the respective survey receiver.

The central server stores at least two of the survey data sets in the survey database on the database server, wherein the survey database by means of the survey data sets stored therein provides an association of the values of the first receiver feature with the values of the selection parameter and with the evaluations of the individual second reaction behavior.

The transmitter sends the final message to the final receiver and the central server reads out a value of the first receiver feature of the final receiver from the receiver database, wherein the final message comprises at least one first final message feature, the first final message feature is changeable by means of a change in a corresponding value of the selection parameter and the value of the selection parameter is adapted to the read-out value of the first receiver feature of the final receiver by means of the association provided by the survey database and a relevance of the final message for the final receiver is ascertainable in the form of an individual estimated reaction value before sending the final message.

Further advantages, features and details of the invention result from the following description of at least one preferred embodiment to which the invention is not limited, as well as from the figures.

Figure 2:
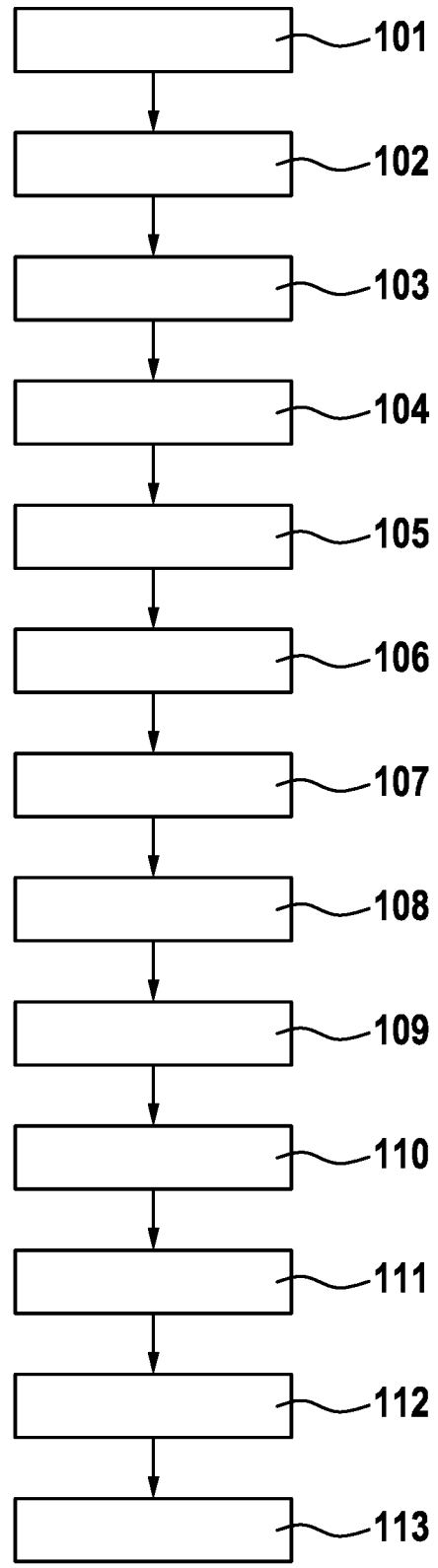
FIG. 2 the individual method steps for communication in the communication network according to FIG. 1 in a preferred order.

These show in:

FIG. 2 shows individual method steps of the provided method in a preferred order.

In a first step 101 of the method a first test message 10a, a second test message 10b, a third test message 10c, and a fourth test message 10d are generated by means of the central server 8, wherein each test message 10a, 10b, 10c, 10d comprises at least one first message feature 12a, 12b, 12c, 12d, and the first message feature 12a of the first test message 10a and the first message feature 12b of the second test message 10b are changeable by means of a change in a respective corresponding value 14a, 14b of a first parameter, and the first message feature 12c of the third test message 10c and the first message feature 12d of the fourth test message 10d are changeable by means of a change in a respective corresponding value 14c, 14d of a second parameter, and the respective corresponding values 14a, 14b of the first parameter are different and the respective corresponding values 14c, 14d of the second parameter are different.

In a second step 102 of the method the first test message 10a, the second test message 10b, the third test message 10c, and the fourth test message 10d to the first test receiver 11a, the second test receiver 11b, the third test receiver 11c, and/or the fourth test receiver 11d by means of the transmitter 2.

In a third step 103 a first reaction behavior with respect to the test messages 10a, 10b, 10c, 10d is detected by means of the tracking server 5.

In a fourth step 104 the first reaction behavior is evaluated by means of the evaluation module 121.

In a fifth step 105 an influence value of the first parameter, which detects an influence of the first parameter on the first reaction behavior with respect to the test messages 10a, 10b, 10c, 10d, and an influence value of the second parameter, which detects an influence of the second parameter on the first reaction behavior with respect to the test messages 10a, 10b, 10c, 10d are determined. This determination is carried out preferably by means of the evaluation module 121.

In a sixth step 106 the influence value of the first parameter is compared to the influence value of the second parameter, and a selection parameter 52 is determined by means of the selection module 122, wherein the particular one of the two parameters, the first parameter and the second parameter that has the greater influence on the first reaction behavior is determined as the selection parameter 52.

In a seventh step 107 at least one first survey message 21a, a second survey message 21b, and preferably a third survey message 21c is generated by means of the central server 8, wherein the survey messages 21a, 21b, 21c each comprise at least one first selection message feature 20a, 20b, 20c, wherein the respective first selection message feature 20a, 20b, 20c is changeable by means of a change in a respective corresponding value 23a, 23b, 23c of the selection parameter 52, and the value 23a of the selection parameter 52 of the first selection message feature 20a of the first survey message 21a is different from the value 23b of the selection parameter 52 of the first selection message feature 20b of the second survey message 21b.

In an eighth step 108 the first survey message 21a, the second survey message 21b, and preferably the third survey message 21c are sent to at least the first survey receiver 22a, the second survey receiver 22b, and/or the third survey receiver 22c by means of the transmitter 2, wherein the survey receivers 22a, 22b, 22c are distinguishable by at least one first receiver feature 51. It may be provided that as well as the first survey message 21a, the second survey message 21*b* and/or the third survey message 21*c* is sent to the respective survey receivers 22*a*, 22*b* and 22*c*.

In a ninth step 109 a second reaction behavior with respect to the survey messages 21*a*, 21*b*, 21*c* is detected by means of the tracking server 5.

In a tenth step 110 the second reaction behavior is evaluated by means of the evaluation module 121.

In an eleventh step 110 a respective survey data set 26*a*, 26*b*, 26*c*, 26*d* for at least the first survey receiver 22*a*, the second survey receiver 22*b* and preferably the third survey receiver 22*c* is created, wherein the respective survey data set 26*a*, 26*b*, 26*c*, 26*d* comprises a value 28*a*, 28*b*, 28*c*, 28*b* of the first receiver feature 51 of the respective survey receiver 22*a*, 22*b*, 22*c*, for example an age of a user of the respective survey receiver 22*a*, 22*b*, 22*c*, an evaluation 27*a*, 27*b*, 27*c*, 27*d* of a corresponding individual second reaction behavior of the respective survey receiver 22*a*, 22*b*, 22*c*, and a corresponding value 23*a*, 23*b*, 23*c* of the selection parameter of the survey message 21*a*, 21*b*, 21*c* received by the respective survey receiver 22*a*, 22*b*, 22*c*.

In the event that at least one of the survey receivers 22*a*, 22*b* and/or 22*c* has received more than one survey message, an additional survey data set may, for example the survey data set 26*d* in the survey database 7, be stored, which comprises the respective value 28*a*, 28*b* or 28*c* of the first receiver feature of the corresponding survey receiver 22*a*, 22*b* or 22*c*, which has received more than one survey message, the evaluation 27*d* of an individual second reaction behavior with respect to the additionally received survey message 21*a*, 21*b* or 21*c* of the corresponding survey receiver 22*a*, 22*b* or 22*c* and the value 23*a*, 23*b* or 23*c* of the selection parameter of the additionally received survey message 21*a*, 21*b* and 21*c* respectively. In FIG. 2 the example is shown in which the survey receiver 22*b* has received the survey message 21*a* in addition to the survey message 21*b* and the survey receivers 22*a* and 22*c* have received the survey message 21*c* and 21*a* respectively.

In a twelfth step 112 at least two of the survey data sets 26*a*, 26*b*, 26*c*, 26*d* are stored in the survey database 7 on the database server 9, wherein an association of the values 28*a*, 28*b*, 28*c*, 28*b* of the first receiver feature 51 with the values 23*a*, 23*b*, 23*c* of the selection parameter 52 and with the evaluations 27*a*, 27*b*, 27*c*, 27*d* of the individual second reaction behavior is provided by means of the survey data sets 26*a*, 26*b*, 26*c*, 26*d* stored in the survey database 7.

In a thirteenth step 113 a final message 30*a* is sent by means of the transmitter 2, wherein a value 29*a* of the first receiver feature 51 of the final receiver 3*a* is read out from the receiver database 6, the final message 30*a* comprises at least one first final message feature 31*a*, wherein the first final message feature 31*a* is changeable by means of a change in a corresponding value 32*a* of the selection parameter 52, and the value 32*a* of the selection parameter 52 is adapted to the read-out value 29*a* of the first receiver feature 51 of the final receiver 3*a* by means of the association provided by the survey database, and a relevance of the final message 30*a* for the final receiver 3*a* is determined in the form of an individual estimated reaction value 53 of the final receiver 3*a* before sending the final message 30*a*.

In the same way, further final messages 30*b* and 30*c* with a final message feature 31*b* and 31*c* respectively may be sent to further final receivers 3*b* and 3*c* by means of the transmitter 2, wherein respective values 32*b* and 32*c* of the selection parameter 52 corresponding to the respective final message feature 31*b* and 31*c* are adapted to the values 29*b* and 29*c* of the first receiver feature of the further final receivers 3*b* and 3*c* and a respective relevance of the final messages 30*b* and 30*c* for the final receivers 3*b* and 3*c* is determined in the form of an individual estimated reaction behavior 53 of the final receivers 3*b* and 3*c* before sending the final messages 30*b* and 30*c*. Preferably, the respective final messages 30*a*, 30*b* and 30*c* may comprise further final receiver specific data 34*a*, 34*b* and 34*c*, which are assigned to the respective final receiver 3*a*, 3*b* and 3*c* in the receiver database 6. The individual data 34*a*, 34*b* and 34*c* may be preferably used when generating the final messages 30*a*, 30*b* and 30*c* by means of the central server 8.

The steps one 101 to thirteen 113 may be carried out in the order described above. It is also possible to carry out a different order of the steps. The above presented order of the steps one to thirteen is only a particularly advantageous embodiment of the provided method.

Preferably the transmitter 2 is constructed as a distribution server. By means of the distribution server 2 the messages, i.e. the test messages 10, the survey messages 21 and the final message 30*a* and preferably the further final messages 30*b* and 30*c*, are sent to the corresponding receivers, i.e. the test receivers 11, the survey receivers 22 and the final receiver 3. The transmitter 2, the tracking server 5, the central server 8 and the database server 9 are preferably arranged in a building and the receivers are arranged outside this building. In particular, the receivers are arranged spatially separated from the transmitter 2, preferably at least one kilometer away from the transmitter 2.

Figure 3:
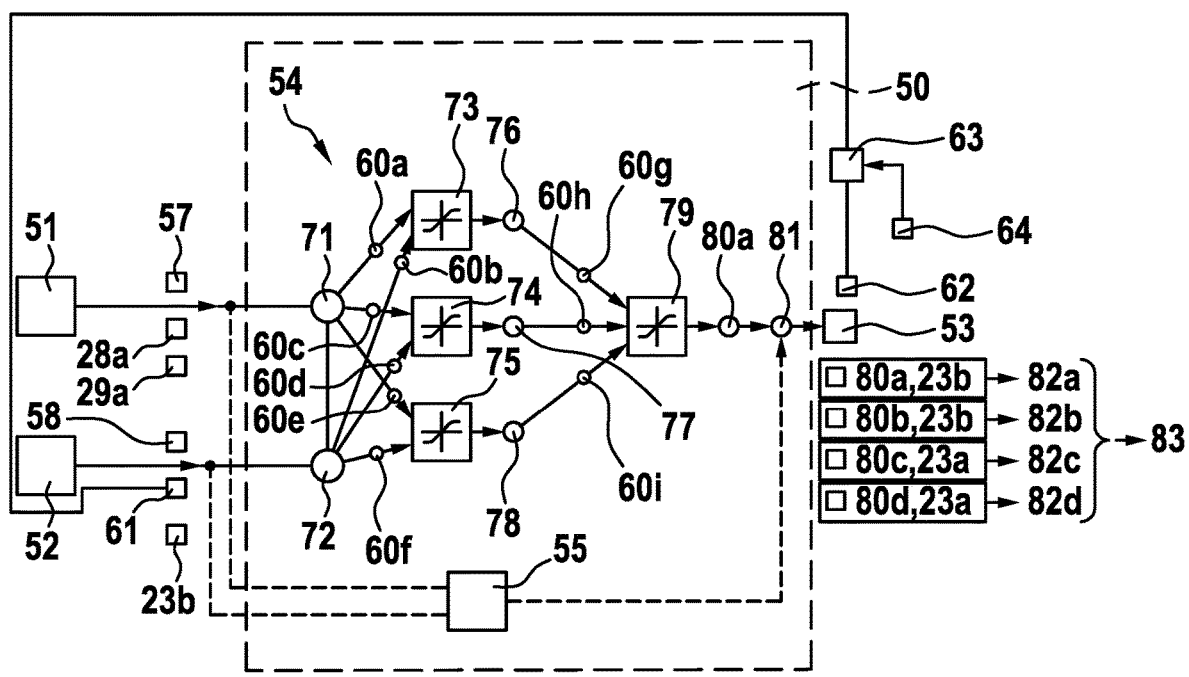
FIG. 3 the communication network according to FIG. 1 with an approximation module.
Figure 4:
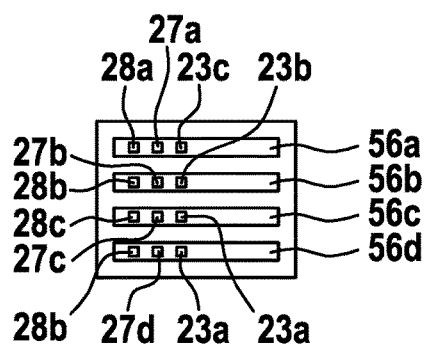
FIG. 4 a use of survey data sets as training data sets.

FIG. 3 shows an approximation module 50 of the communication network 1. A preferred embodiment of the method provides that a functional relationship between the values 28*a*, 28*b*, 28*c*, 28*b* of the first receiver feature 51 of the survey receivers 22*a*, 22*b*, 22*c*, the evaluations 27*a*, 27*b*, 27*c*, 27*d* of the corresponding individual second response behavior of the survey receivers 22*a*, 22*b*, 22*c*, and the corresponding values 23*a*, 23*b*, 23*c* of the selection parameter of the survey messages 21*a*, 21*b*, 21*c* received by the survey receivers 22*a*, 22*b*, 22*c* is approximated by means of the approximation module 50. The approximation module 50 may comprise a neuronal network 54 and/or a polynomial function 55. Here, the individual survey data sets 26*a*, 26*b*, 26*c* and 26*d* may be readout from the survey database 7 and used as training data sets 56*a*, 56*b*, 56*c* and 56*d* of the neuronal network or the polynomial function 55, which comprises at least one composite polynomial, as shown in FIG. 4.

Thereby, the training data sets 56*a*, 56*b*, 56*c* and 56*d* are preferably divided respectively and the respective values 28*a*, 28*b*, 28*c*, 28*b* of the first receiver feature 51 are transmitted electronically in the form of a first input signal 57 to a first input 71 of the neuronal network 54 and the respective values 23*b*, 23*b*, 23*a* and 23*a* of the selection parameter 52 are transmitted electronically in the form of a second input signal 58 to a second input 72 of the neuronal network 54 for training the neuronal network 54.

The neuronal network 54 comprises preferably several parameters 60*a*, 60*b*, 60*c*, 60*d*, 60*e*, 60*f*, 60*g*, 60*h* and 60*i*. Depending on which values these parameters assume, an individual estimated reaction value 53 is calculated on the basis of the first input signal 57 and the second input signal 58. This is illustrated in the following by the training data set 56*a*.

To calculate an output value 80*a*, the value 28*a* is electronically transmitted as the first input signal 57 to the first input 71 on the one hand and the value 28*b* is electronically transmitted as the second input signal 58 to the second input 72 on the other hand. The value 28*a* is then multiplied by the value of the parameter 60*a* and the value 23*b* is multiplied by the value of the parameter 60b and the respective products are summed up to a sum and this sum is electronically transmitted to a first tangent hyperbolicus function 73 as input value. On the basis of this input value, a first function value 76 of the tangent hyperbolicus function 73 is calculated.

In the same way, the value 28a is subsequently multiplied by the value of the parameter 60c and the value 23b is multiplied by the value of the parameter 60d and the respective products are summed up to a sum and this sum is electronically transmitted to a second tangent hyperbolicus function 74 as input value. On the basis of this input value, a second function value 77 of the second tangent hyperbolicus function 74 is calculated.

In the same way, the value 28a is subsequently multiplied by the value of the parameter 60e and the value 23b is multiplied by the value of the parameter 60f and the respective products are summed up to a sum and this sum is electronically transmitted to a third tangent hyperbolicus function 75 as input value. On the basis of this input value, a third function value 78 of the third tangent hyperbolicus function 75 is calculated.

The function values 76, 77 and 78 are subsequently respectively multiplied by the values of the parameters 60g, 60h and 60i and added up to a sum and this sum is electronically transmitted to a fourth tangent hyperbolicus function 79 as input value. On the basis of this input value a fourth function value 80a of the fourth tangent hyperbolicus function 79 is calculated. This calculated function value 80a is transmitted electronically to an output 81 of the neuronal network 54. The calculated function value 80c corresponds to an individual estimated reaction value 53 for the training data set 56a and is transmitted electronically to the output 81.

In the same way, with constant values of the parameters 60a, 60b, 60c, 60d, 60e, 60f, 60g, 60h and 60i, an output value 80b, 80c and 80d may be calculated respectively for the training data sets 56b, 56c and 56d on the basis of the values 28b, 28c and 28b as first input signal 57 and the values 23b, 23a and 23a as second input signal 58.

When training the neuronal network 54 for each calculated output value 80a, 80b, 80c and 80d a deviation value 82a, 82b, 82c and 82d is calculated respectively in the form of a difference between the evaluations 27a, 27b, 27c and 27d of the respective individual second reaction behavior of the survey receivers 22a, 22b and 22c and the calculated output values 80a, 80b, 80c and 80d. The deviation values 82a, 82b, 82c and 82d are preferably summed up to a mean deviation 83. The mean deviation 83 is preferably differentiated respectively with respect to the parameters 60a, 60b, 60c, 60d, 60e, 60f, 60g, 60h and 60i of the neuronal network 54 and respectively a derivation value is determined and for each parameter a respective change value of the parameter is determined, which is preferably directly proportional to the respective derivation value.

Subsequently, the individual parameters of the neuronal network 54 are changed by the respective change value. After changing the parameters 60a, 60b, 60c, 60d, 60e, 60f, 60g, 60h and 60i of the neuronal network 54, the output values 80a, 80b, 80c and 80d and the deviation values 82a, 82b, 82c and 82d are calculated again in the same way as described above and a change in the parameters 60a, 60b, 60c, 60d, 60e, 60f, 60g, 60h and 60i is carried out again. This procedure is repeated until the deviation values 82a, 82b, 82c and 82d are less than a predefined value or an absolute value of the sum of the deviation values 82a, 82b, 82c and 82d is less than a predefined value. This iterative method is a preferred variant of the training of the neuronal network. Other variants of the training may comprise a Hebb rule, a delta rule, backpropagation training and/or competitive learning.

The training of the approximation module corresponds to the approximation of the functional relationship between the values 28a, 28b, 28c, 28b of the first receiver feature 51 of the survey receivers 22a, 22b, 22c, the evaluations 27a, 27b, 27c, 27d of the corresponding individual second reaction behavior of the survey receivers 22a, 22b, 22c and the corresponding values 23a, 23b, 23c of the selection parameter of the survey messages 21a, 21b, 21c received by the survey receivers 22a, 22b, 22c.

In the thirteenth step 113, the value of the selection parameter 52 corresponding to the value of the final message feature 31a is adapted to the value 29a of the first receiver feature 51 of the final receiver 3a.

In a first variant the adaptation may be carried out by means of the approximation module 50. This may be carried out in such a way, for example, that a first output value is calculated based on the value 29a of the first receiver feature 51 of the final receiver 3a and an initial value 61 of the selection parameter 52 by means of the neuronal network 54 or the polynomial function 55 respectively and is transmitted as first individual estimated reaction value 62 of the final receiver 3a to the output 81. If this individual estimated reaction value 62 deviates from a predefined target reaction value 64, for example is less than the predefined target reaction value 64 in terms of the absolute value, the initial value 61 of the selection parameter 52 is changed by means of an iteration module 63 and an individual estimated reaction value 62 is calculated again by means of the approximation module 50.

This process is preferably repeated until the individual estimated reaction value 62 is greater than in terms of the absolute value or within the limits of a tolerance range of, for example, one percent similar in quantity to the target reaction value 64 and is thus adapted to the target reaction value 64. In doing so, the initial value 61 of the selection parameter 52 is calculated again as second input signal 58 by means of the iteration module 63 each time the individual estimated reaction value 62 is calculated again and the value 29a of the first receiver feature 51 of the final receiver 3a as first input signal 57 is kept constant. The start value 61 of the last iteration corresponds to the adapted value 32a of the selection parameter 52 corresponding to the final message feature 31a. With the aid of the adapted value 32a the final message 3a may be generated by means of the distribution server 8, wherein the final message feature 31a is constructed as a function of the adapted value 32a.

With the particular embodiment of the method described above, particularly when adapting the initial value 61 of the selection parameter 52 to the value 29a of the first receiver feature 51 of the final receiver 3a, the individual estimated reaction value of the final receiver 3a is determined in the sense of the invention, for example in the form of the individual estimated survey reaction value 62 of the final receiver 3a.

Figure 5:
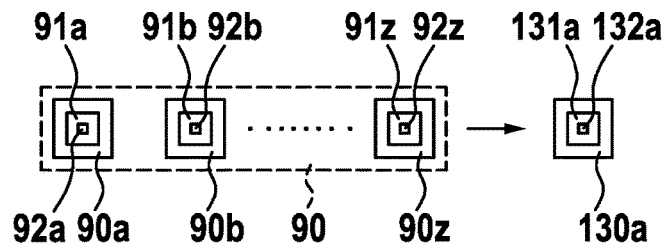
FIG. 5 a selection of a final message from a set of messages.

In a second variant, the adaptation of the value 132a of the selection parameter 52 corresponding to the final message feature 131a to the value 29a of the first receiver feature 51 of the final receiver 3a is carried out by selecting the final message 130a. This variant provides that the final message 130a is selected from a set 90 of messages 90a, 90b, 90z, which preferable originate from several information sources, cf. FIG. 5. The messages 90a, 90b, 90z comprise respectively at least one message feature 91a, 91b, 91z and the respective message features 91a, 91b, 91z comprise different values 92a, 92b, 92z of the selection parameter 52. The value 132a of the selection parameter 52 of the final message 130a is adapted to the value 29a of the first receiver feature 51.

Preferably, the particular one of the messages 90a, 90b to 90z whose value 92a, 92b, 92z of the selection parameter 52 is closest to the initial value 61 of the last iterative calculation of the individual estimated reaction value 62 of the final receiver 3a is selected as the final message 130a. The initial value 61 of the last iterative calculation of the individual estimated reaction value 62 corresponds to the value 132a of the selection parameter 52 of the final message 130a, which is adapted to the value 29a of the first receiver feature 51 of the final receiver 3a, corresponding to the final message feature 131a.

FIG. 2 and FIG. 3 show furthermore a communication network 1 for determining a relevance of a final message 30a for a final receiver 3a before sending the final message 30a. The communication network 1 comprises a first test receiver 11a, a second test receiver 11b, a third test receiver 11c and/or a fourth test receiver 11d, a first survey receiver 22a, a second survey receiver 22b and/or a third survey receiver 22c, a final receiver 3a, a receiver database 6, a survey database 7.

The communication network 1 furthermore comprises a central server 8 that generates a first test message 10a, a second test message 10b, a third test message 10c and a fourth test message 10d, wherein each test message 10a, 10b, 10c, 10d comprises at least one first message feature 12a, 12b, 12c, 12d, and the first message feature 12a of the first test message 10a and the first message feature 12b of the second test message 10b are changeable by means of a change in a respective corresponding value 14a, 14b of a first parameter, and the first message feature 12c of the third test message 10c and the first message feature 12d of the fourth test message 10d are changeable by means of a change in a respective corresponding value 14c, 14d of a second parameter, and the respective corresponding values 14a, 14b of the first parameter are different and the respective corresponding values 14c, 14d of the second parameter are different.

The communication network 1 furthermore comprises a transmitter 2 that sends the first test message 10a, the second test message 10b, the third test message 10c, and the fourth test message 10d to the first test receiver 11a, the second test receiver 11b, the third test receiver 11c, and/or the fourth test receiver 11d.

The communication network 1 furthermore comprises a tracking server 5 that detects a first reaction behavior with respect to the test messages 10a, 10b, 10c, 10d.

The communication network 1 furthermore comprises an evaluation module 121 that evaluates the first reaction behavior and determines an influence value of the first parameter, which detects an influence of the first parameter on the first reaction behavior, and an influence value of the second parameter, which detects an influence of the second parameter on the first reaction behavior.

The communication network 1 furthermore comprises a selection module 122 that compares the influence value of the first parameter to the influence value of the second parameter and determines a selection parameter 52, wherein the particular one of the two parameters, the first parameter and the second parameter that has the greater influence on the first reaction behavior is the selection parameter 52.

The central server 8 generates at least one first survey message 21a, a second survey message 21b and preferably a third survey message 21c, wherein the survey messages 21a, 21b, 21c respectively comprise at least one first selection message feature 20a, 20b, 20c, the respective first selection message feature 20a, 20b, 20c is changeable by means of a change in a respective corresponding value 23a, 23b, 23c of the selection parameter 52 and the value 23a of the selection parameter 52 of the first selection message feature 20a of the first survey message 21a is different from the value 23b of the selection parameter of the first selection message feature 20b of the second survey message 21b.

The transmitter 2 sends the first survey message 21a, the second survey message 21b and preferably the third survey message 21c at least to the first survey receiver 22a, the second survey receiver 22b, and/or the third survey receiver 22c, wherein the survey receivers 22a, 22b, 22c are distinguishable by at least one first receiver feature 51.

The tracking server 5 detects a second reaction behavior with respect to the survey messages 21a, 21b, 21c. The evaluation module 121 evaluates the second reaction behavior. The central server 8 creates a respective survey data set 26a, 26b, 26c, 26d for at least two survey receivers 22a, 22b, 22c, wherein the respective survey data set 26a, 26b, 26c, 26d comprises a value 28a, 28b, 28c, 28b of the first receiver feature 51 of the respective survey receiver 22a, 22b, 22c, an evaluation 27a, 27b, 27c, 27d of a corresponding second reaction behavior of the respective survey receiver 22a, 22b, 22c and a corresponding value 23a, 23b, 23c of the selection parameter of the survey message 21a, 21b, 21c received by the respective survey receiver 22a, 22b, 22c.

The central server 8 stores at least two of the survey data sets 26a, 26b, 26c, 26d in the survey database 7 on the database server 9, wherein the survey database 7 by means of the survey data sets 26a, 26b, 26c, 26d stored therein provides an association of the values 28a, 28b, 28c, 28b of the first receiver feature 51 with the values 23a, 23b, 23c of the selection parameter 52 and with the evaluations 27a, 27b, 27c, 27d of the individual second reaction behavior.

The transmitter 2 sends the final message 30a to the final receiver 3a and the central server 8 reads out a value 29a of the first receiver feature 51 of the final receiver 3a from the receiver database 6, wherein the final message 30a comprises at least one first final message feature 31a, the first final message feature 31a is changeable by means of a change in a corresponding value 32a of the selection parameter 52 and the value 32a of the selection parameter 52 is adapted to the read-out value 29a of the first receiver feature 51 of the final receiver 3a by means of the association provided by the survey database 7 and a relevance of the final message 30a for the final receiver 3a is ascertainable in the form of an individual estimated reaction value 53 before sending the final message 30a.

The invention claimed is:

1. A method for communication in a communication network (1) with at least one transmitter (2) and at least one receiver (3a), wherein at least one message is sent from the transmitter (2) to the receiver (3a), and a relevance of the message for the receiver is determined, characterized in that
the communication network (1) comprises at least one test receiver (11a), a first survey receiver (22a), a second survey receiver (22b), a final receiver (3a), a tracking server (5), a receiver database (6), a survey database (7), an evaluation module (121), a selection module (122), and a central server (8), and a relevance of a final message (30a) for the final receiver (3a) is determined before the final message (30a) is sent, having the following steps:
generating a first test message (10a), a second test message (10b), a third test message (10c), and a fourth test message (10*d*) by means of the central server (8), wherein each test message (10*a*, 10*b*, 10*c*, 10*d*) comprises at least one first message feature (12*a*, 12*b*, 12*c*, 12*d*), and the first message feature (12*a*) of the first test message (10*a*) and the first message feature (12*b*) of the second test message (10*b*) are changeable by means of a change in a respective corresponding value (14*a*, 14*b*) of a first parameter, and the first message feature (12*c*) of the third test message (10*c*) and the first message feature (12*d*) of the fourth test message (10*d*) are changeable by means of a change in a respective corresponding value (14*c*, 14*d*) of a second parameter, and the respective corresponding values (14*a*, 14*b*) of the first parameter are different and the respective corresponding values (14*c*, 14*d*) of the second parameter are different;

transmitting the first test message (10*a*), the second test message (10*b*), the third test message (10*c*), and the fourth test message (10*d*) to a first test receiver (11*a*), a second test receiver (11*b*), a third test receiver (11*c*), and/or a fourth test receiver (11*d*) by means of the transmitter (2);

detecting a first reaction behavior with respect to the test messages (10*a*, 10*b*, 10*c*, 10*d*) by means of the tracking server (5);

evaluating the first reaction behavior by means of the evaluation module (121);

determining an influence value of the first parameter, which detects an influence of the first parameter on the first reaction behavior with respect to the test messages (10*a*, 10*b*, 10*c*, 10*d*), and determining an influence value of the second parameter, which detects an influence of the second parameter on the first reaction behavior with respect to the test messages (10*a*, 10*b*, 10*c*, 10*d*), comparing the influence value of the first parameter to the influence value of the second parameter, and determining a selection parameter (52) by means of the selection module (122), wherein the particular one of the two parameters, the first parameter and the second parameter, that has the greater influence on the first reaction behavior is determined as the selection parameter (52);

generating at least one first survey message (21*a*) and a second survey message (21*b*) by means of the central server (8), wherein the survey messages (21*a*, 21*b*) each have at least one first selection message feature (20*a*, 20*b*), wherein the respective first selection message feature (20*a*, 20*b*) is changeable by means of a change in a respective corresponding value (23*a*, 23*b*) of the selection parameter (52), and the value (23*a*) of the selection parameter (52) of the first selection message feature (20*a*) of the first survey message (21*a*) is different from the value (23*b*) of the selection parameter (52) of the first selection message feature (20*b*) of the second survey message (21*b*);

sending the first survey message (21*a*) and the second survey message (21*b*) to at least one first survey receiver (22*a*), a second survey receiver (22*b*), and/or a third survey receiver (22*c*) by means of the transmitter (2), wherein the survey receivers (22*a*, 22*b*, 22*c*) are distinguishable by at least one first receiver feature (51);

detecting a second reaction behavior with respect to the survey messages (21*a*, 21*b*) by means of the tracking server (5);

evaluating the second reaction behavior by means of the evaluation module (121);

creating a respective survey data set (26*b*, 26*c*, 26*d*) for at least two survey receivers (22*b*, 22*c*), wherein the respective survey data set (26*b*, 26*c*, 26*d*) comprises a value (28*b*, 28*c*, 28*b*) of the first receiver feature (51) of the respective survey receiver (22*b*, 22*c*), an evaluation (27*b*, 27*c*, 27*d*) of a corresponding individual second reaction behavior of the respective survey receiver (22*b*, 22*c*), and a corresponding value (23*a*, 23*b*) of the selection parameter of the survey message (21*a*, 21*b*) received by the respective survey receiver (22*b*, 22*c*);

storing at least two of the survey data sets (26*b*, 26*c*, 26*d*) in the survey database (7) on the database server (9), wherein an association of the values (28*b*, 28*c*, 28*b*) of the first receiver feature (51) with the values (23*a*, 23*b*) of the selection parameter (52) and with the evaluations (27*b*, 27*c*, 27*d*) of the individual second reaction behavior is provided by means of the survey data sets (26*b*, 26*c*, 26*d*) stored in the survey database (7);

sending the final message (30*a*) by means of the transmitter (2), wherein a value (29*a*) of the first receiver feature (51) of the final receiver (3*a*) is read out from the receiver database (6), the final message (30*a*) comprises at least one first final message feature (31*a*), the first final message feature (31*a*) is changeable by means of a change in a corresponding value (32*a*) of the selection parameter (52), the value (32*a*) of the selection parameter (52) is adapted to the read-out value (29*a*) of the first receiver feature (51) of the final receiver (3*a*) by means of the association provided by the survey database and a relevance of the final message (30*a*) for the final receiver (3*a*) is determined before sending the final message (30*a*) in the form of an individual estimated reaction value (53) of the final receiver (3*a*).

2. The method of claim 1, characterized in that the test messages (10*a*, 10*b*, 10*c*, 10*d*) are generated in such a manner that the first test message (10*a*) comprises a second message feature (13*a*), the second test message (10*b*) comprises a second message feature (13*b*), the third test message (10*c*) comprises a second message feature (13*c*), and the fourth test message (10*d*) comprises a second message feature (13*d*) and the second message feature (13*a*, 13*b*) of the first and the second test message (10*a*, 10*b*) is each changeable by means of a change respectively in a value (15*a*, 15*b*) of the second parameter and the second message feature (13*c*, 13*d*) of the third and the fourth test message (10*c*, 10*d*) is each changeable by means of a change respectively in a value (15*c*, 15*d*) of the first parameter and the values (14*a*, 14*b*, 14*c*, 14*d*, 15*a*, 15*b*, 15*c*, 15*d*) of the first and the second parameter of the test messages (10*a*, 10*b*, 10*c*, 10*d*) are each values in a narrow range of an extreme value of a respective value range of the parameters.

3. The method of claim 1, characterized in that the first message feature (12*a*) of the first test message (10*a*) and the first message feature (12*b*) of the second test message (10*b*) is a content element and/or the first message feature (12*c*) of the first third message (10*c*)

and the first message feature (12*d*) of the fourth test message (10*d*) is a content element.

4. The method of claim 3, characterized in that the content element of the first test message (10*a*) and/or third test message (10*c*) comprises at least partially the identical content as the content element of the second test message (10*b*) and the fourth test message (10*d*) respectively.

5. The method of claim 3, characterized in that the first selection message feature (20*a*, 20*b*, 20*c*) of the survey messages (21*a*, 21*b*, 21*c*) and the final message feature (31*a*) each are content elements and comprise at least partially the identical content.

6. The method of claim 2, characterized in that The first selection message feature (20*a*, 20*b*, 20*c*) of the survey messages (21*a*, 21*b*, 21*c*), the final message feature (31*a*) and the first and the second message features (12*a*, 12*b*, 12*c*, 12*d*, 13*a*, 13*b*, 13*c*, 13*d*) of the test messages (10*a*, 10*b*, 10*c*, 10*d*) each are content elements and the final message feature (31*a*) comprises parts of the particular message feature of the test messages (10*a*, 10*b*, 10*c*, 10*d*), which is changeable by means of change in the selection parameter.

7. The method of one claim 1, characterized in that the first message feature (12*a*, 12*b*) of the first test message (10*a*) and the second test message (10*b*) is a time value and/or the first message feature (12*c*, 12*d*) of the third test message (10*c*) and the fourth test message (10*d*), the respective first selection message feature (20*a*, 20*b*, 20*c*) of the survey messages (21*a*, 21*b*, 21*c*) and the final message feature (31*a*) of the final message (30*a*) is a time value.

8. The method of claim 1, characterized in that the test receivers (11*a*, 11*b*, 11*c*, 11*d*), the survey receivers (22*a*, 22*b*, 22*c*) and/or the final receiver (3*a*) are designed as user devices each assigned to a user and the receiver feature is designed as a user feature.

9. The method of claim 1, characterized in that the communication network (1) comprises an approximation module (50), and a functional relationship between the values (28*a*, 28*b*, 28*c*, 28*b*) of the first receiver feature (51) of the survey receivers (22*a*, 22*b*, 22*c*), the evaluations (27*a*, 27*b*, 27*c*, 27*d*) of the corresponding individual second reaction behavior of the survey receivers (22*a*, 22*b*, 22*c*), and the corresponding values (23*a*, 23*b*, 23*c*) of the selection parameter of the survey messages (21*a*, 21*b*, 21*c*) received by the survey receivers (22*a*, 22*b*, 22*c*) is approximated by means of the approximation module (50).

10. The method of claim 1, characterized in that the value (23*a*) of the selection parameter (52) corresponding to the final message feature (31*a*) is adapted to the value (29*a*) of the first receiver feature of the final receiver (3*a*) in such a way, that the individual estimated reaction value (53) is adapted to a target reaction value (64).

11. The method of claim 9, characterized in that The value (32*a*) of the selection parameter (52) corresponding to the final message feature (31*a*) is adapted to the value (29*a*) of the first receiver feature (51) of the final receiver (3*a*) by means of the approximation module.

12. The method of claim 9, characterized in that the approximation module (50) comprises a neuronal network (54).

13. The method of claim 1, characterized in that the final message (130*a*) is selected from a set (90) of messages (90*a*, 90*b*, 90*z*), that originate from several information sources, wherein the messages (90*a*, 90*b*, 90*z*) each comprise a message feature (91*a*, 91*b*, 91*z*) and the respective message features (91*a*, 91*b*, 91*z*) comprise different values (90*a*, 90*b*, 90*z*) of the selection parameter (52) and the value (132*a*) of the selection parameter (52) of the final message (130*a*) is adapted to the value (29*a*) of the first receiver feature (51).

14. Nonvolatile computer-readable information storage medium with stored information that when executed by a processor causes the execution of the steps of claim 1.

15. A communication network (1) for determining a relevance of a final message (30*a*) for a final receiver (3*a*) before sending the final message (30*a*) comprising:

a first test receiver (11*a*), a second test receiver (11*b*), a third test receiver (11*c*) and/or a fourth test receiver (11*d*), a first survey receiver (22*a*), a second survey receiver (22*b*) and/or a third survey receiver (22*c*), a final receiver (3*a*), a receiver database (6), a survey database (7);

a central server (8) that generates a first test message (10*a*), a second test message (10*b*), a third test message (10*c*) and a fourth test message (10*d*), wherein each test message (10*a*, 10*b*, 10*c*, 10*d*) comprises at least one first message feature (12*a*, 12*b*, 12*c*, 12*d*), and the first message feature (12*a*) of the first test message (10*a*) and the first message feature (12*b*) of the second test message (10*b*) are changeable by means of a change in a respective corresponding value (14*a*, 14*b*) of a first parameter, and the first message feature (12*c*) of the third test message (10*c*) and the first message feature (12*d*) of the fourth test message (10*d*) are changeable by means of a change in a respective corresponding value (14*c*, 14*d*) of a second parameter, and the respective corresponding values (14*a*, 14*b*) of the first parameter are different and the respective corresponding values (14*c*, 14*d*) of the second parameter are different;

a transmitter (2) that sends the first test message (10*a*), the second test message (10*b*), the third test message (10*c*), and the fourth test message (10*d*) to the first test receiver (11*a*), the second test receiver (11*b*), the third test receiver (11*c*), and/or the fourth test receiver (11*d*);

a tracking server (5) that detects a first reaction behavior with respect to the test messages (10*a*, 10*b*, 10*c*, 10*d*);

an evaluation module (121) that evaluates the first reaction behavior and determines an influence value of the first parameter, which detects an influence of the first parameter on the first reaction behavior, and an influence value of the second parameter, which detects an influence of the second parameter on the first reaction behavior, a selection module (122) that compares the influence value of the first parameter to the influence value of the second parameter and determines a selection parameter (52), wherein the particular one of the two parameters, the first parameter and the second parameter, that has the greater influence on the first reaction behavior is the selection parameter (52);

wherein the central server (8) generates at least one first survey message (21*a*) and a second survey message (21b), and the survey messages (21a, 21b) respectively comprise at least one first selection message feature (20a, 20b), the respective first selection message feature (20a, 20b) is changeable by means of a change in a respective corresponding value (23a, 23b, 23c) of the selection parameter (52) and the value (23a) of the selection parameter (52) of the first selection message feature (20a) of the first survey message (21a) is different from the value (23b) of the selection parameter of the first selection message feature (20b) of the second survey message (21b);

wherein the transmitter (2) sends the first survey message (21a) and the second survey message (21b) at least to the first survey receiver (22a), the second survey receiver (22b), and/or the third survey receiver (22c) and the survey receivers (22a, 22b, 22c) are distinguishable by at least one first receiver feature (51);

wherein the tracking server (5) detects a second reaction behavior with respect to the survey messages (21a, 21b);

wherein the evaluation module (121) evaluates the second reaction behavior;

wherein the central server (8) creates a respective survey data set (26b, 26c, 26d) for at least two survey receivers (22b, 22c), wherein the respective survey data set (26b, 26c, 26d) comprises a value (28b, 28c, 28b) of the first receiver feature (51) of the respective survey receiver (22b, 22c), an evaluation (27b, 27c, 27d) of a corresponding second reaction behavior of the respective survey receiver (22b, 22c) and a corresponding value (23a, 23b) of the selection parameter of the survey message (21a, 21b) received by the respective survey receiver (22b, 22c);

wherein the central server (8) stores at least two of the survey data sets (26b, 26c, 26d) in the survey database (7) on the database server (9), wherein the survey database (7) by means of the survey data sets (26b, 26c, 26d) stored therein provides an association of the values (28b, 28c, 28b) of the first receiver feature (51) with the values (23a, 23b) of the selection parameter (52) and with the evaluations (27b, 27c, 27d) of the individual second reaction behavior;

wherein the transmitter (2) sends the final message (30a) to the final receiver (3a) and the central server (8) reads out a value (29a) of the first receiver feature (51) of the final receiver (3a) from the receiver database (6), the final message (30a) comprises at least one first final message feature (31a), the first final message feature (31a) is changeable by means of a change in a corresponding value (32a) of the selection parameter (52) and the value (32a) of the selection parameter (52) is adapted to the read-out value (29a) of the first receiver feature (51) of the final receiver (3a) by means of the association provided by the survey database and a relevance of the final message (30a) for the final receiver (3a) is ascertainable in the form of an individual estimated reaction value (53) before sending the final message (30a).

16. A transmitter infrastructure (140) for determining a relevance of a final message (30a) for a final receiver (3a) before sending the final message (30a) in a communication network (1) comprising:

a receiver database (6), a survey database (7);

a central server (8) that generates a first test message (10a), a second test message (10b), a third test message (10c) and a fourth test message (10d), wherein each test message (10a, 10b, 10c, 10d) comprises at least one first message feature (12a, 12b, 12c, 12d), and the first message feature (12a) of the first test message (10a) and the first message feature (12b) of the second test message (10b) are changeable by means of a change in a respective corresponding value (14a, 14b) of a first parameter, and the first message feature (12c) of the third test message (10c) and the first message feature (12d) of the fourth test message (10d) are changeable by means of a change in a respective corresponding value (14c, 14d) of a second parameter, and the respective corresponding values (14a, 14b) of the first parameter are different and the respective corresponding values (14c, 14d) of the second parameter are different;

a transmitter (2) that sends the first test message (10a), the second test message (10b), the third test message (10c), and the fourth test message (10d) to a first test receiver (11a), a second test receiver (11b), a third test receiver (11c), and/or a fourth test receiver (11d);

a tracking server (5) that detects a first reaction behavior with respect to the test messages (10a, 10b, 10c, 10d);

an evaluation module (121) that evaluates the first reaction behavior and determines an influence value of the first parameter, which detects an influence of the first parameter on the first reaction behavior, and an influence value of the second parameter, which detects an influence of the second parameter on the first reaction behavior, a selection module (122) that compares the influence value of the first parameter to the influence value of the second parameter, and determines a selection parameter (52), wherein the particular one of the two parameters, the first parameter and the second parameter, that has the greater influence on the first reaction behavior is the selection parameter (52);

wherein the central server (8) generates at least one first survey message (21a) and a second survey message (21b), and the survey messages (21a, 21b) respectively comprise at least one first selection message feature (20a, 20b), the respective first selection message feature (20a, 20b) is changeable by means of a change in a respective corresponding value (23a, 23b) of the selection parameter (52) and the value (23a) of the selection parameter (52) of the first selection message feature (20a) of the first survey message (21a) is different from the value (23b) of the selection parameter of the first selection message feature (20b) of the second survey message (21b);

wherein the transmitter (2) sends the first survey message (21a) the second survey message (21b) at least to a first survey receiver (22a), a second survey receiver (22b), and/or a third survey receiver (22*c*) and the survey receivers (22*a*, 22*b*, 22*c*) are distinguishable by at least one first receiver feature (51);

wherein the tracking server (5) detects a second reaction behavior with respect to the survey messages (21*a*, 21*b*);

wherein the evaluation module (121) evaluates the second reaction behavior;

wherein the central server (8) creates a respective survey data set (26*b*, 26*c*, 26*d*) for at least two survey receivers (22*b*, 22*c*), wherein the respective survey data set (26*b*, 26*c*, 26*d*) comprises a value (28*b*, 28*c*, 28*b*) of the first receiver feature (51) of the respective survey receiver (22*b*, 22*c*), an evaluation (27*b*, 27*c*, 27*d*) of a corresponding second reaction behavior of the respective survey receiver (22*b*, 22*c*) and a corresponding value (23*a*, 23*b*) of the selection parameter of the survey message (21*a*, 21*b*) received by the respective survey receiver (22*b*, 22*c*);

wherein the central server (8) stores at least two of the survey data sets (26*b*, 26*c*, 26*d*) in the survey database (7) on the database server (9), wherein the survey database (7) by means of the survey data sets (26*b*, 26*c*, 26*d*) stored therein provides an association of the values (28*b*, 28*c*, 28*b*) of the first receiver feature (51) with the values (23*a*, 23*b*) of the selection parameter (52) and with the evaluations (27*b*, 27*c*, 27*d*) of the individual second reaction behavior;

wherein the transmitter (2) sends the final message (30*a*) to a final receiver (3*a*) and the central server (8) reads out a value (29*a*) of the first receiver feature (51) of the final receiver (3*a*) from the receiver database (6), the final message (30*a*) comprises at least one first final message feature (31*a*), the first final message feature (31*a*) is changeable by means of a change in a corresponding value (32*a*) of the selection parameter (52) and the value (32*a*) of the selection parameter (52) is adapted to the read-out value (29*a*) of the first receiver feature (51) of the final receiver (3*a*) by means of the association provided by the survey database and a relevance of the final message (30*a*) for the final receiver (3*a*) is ascertainable in the form of an individual estimated reaction value (53) before sending the final message (30*a*).

17. The method of claim 1, wherein the step of generating at least one first survey message (21*a*) and second survey message (21*b*) further comprises generating a third survey message (21*c*), and wherein the step of sending the first survey message (21*a*) and the second survey message (21*b*) further comprises sending the third survey message (21*c*).

18. The method of claim 1, characterized in that the final message (130*a*) is selected from a set (90) of messages (90*a*, 90*b*, 90*z*), wherein the messages (90*a*, 90*b*, 90*z*) each comprise a message feature (91*a*, 91*b*, 91*z*) and the respective message features (91*a*, 91*b*, 91*z*) comprise different values (90*a*, 90*b*, 90*z*) of the selection parameter (52) and the value (132*a*) of the selection parameter (52) of the final message (130*a*) is adapted to the value (29*a*) of the first receiver feature (51).

19. The communication network of claim 15, wherein the central server (8) that generates at least one first survey message (21*a*) and second survey message (21*b*) further generates a third survey message (21*c*), and wherein the transmitter (2) that sends the first survey message (21*a*) and the second survey message (21*b*) further sends the third survey message (21*c*).

20. The transmitter infrastructure of claim 16, wherein the central server (8) that generates at least one first survey message (21*a*) and second survey message (21*b*) further generates a third survey message (21*c*), and wherein the transmitter (2) that sends the first survey message (21*a*) and the second survey message (21*b*) further sends the third survey message (21*c*).

\* \* \* \* \*